(12) United States Patent  
Shin et al.

(10) Patent No.: US 9,240,826 B2  
(45) Date of Patent: Jan. 19, 2016

(54) ELECTRONIC DEVICE AND CONTROL METHOD THEREOF

(71) Applicant: LG ELECTRONICS INC., Seoul (KR)

(72) Inventors: Jungeun Shin, Seoul (KR); Sungchae Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 14/067,439

(22) Filed: Oct. 30, 2013

(65) Prior Publication Data

US 2014/0181686 A1    Jun. 26, 2014

(30) Foreign Application Priority Data

Dec. 20, 2012    (KR) .......................... 10-2012-0149608

(51) Int. Cl.
```
G06F 3/00      (2006.01)
H04B 5/00      (2006.01)
G06F 3/14      (2006.01)
H04M 1/725     (2006.01)
G06F 3/0488    (2013.01)
G06F 3/0482    (2013.01)
G06F 3/038     (2013.01)
```

(52) U.S. Cl.
CPC .............. *H04B 5/0031* (2013.01); *G06F 3/038* (2013.01); *G06F 3/0482* (2013.01); *G06F 3/04886* (2013.01); *G06F 3/1423* (2013.01); *G06F 3/1454* (2013.01); *H04M 1/7253* (2013.01); *H04M 1/72525* (2013.01); *H04M 2250/04* (2013.01); *H04M 2250/12* (2013.01); *H04M 2250/22* (2013.01); *H04M 2250/64* (2013.01)

(58) Field of Classification Search
CPC ...................................................... G06F 3/1454
USPC ......................................................... 715/748
See application file for complete search history.

(56) References Cited

U.S. PATENT DOCUMENTS

| 2006/0146765 | A1 | 7/2006 | Van De Sluis et al. | ........ 370/338 |
| 2010/0245275 | A1 | 9/2010 | Tanaka | ........................... 345/173 |
| 2010/0281363 | A1 | 11/2010 | Inaba | ............................. 715/702 |

OTHER PUBLICATIONS

European Search Report dated Apr. 1, 2014 issued in Application No. 13 19 3854.

*Primary Examiner* — William Titcomb  
(74) *Attorney, Agent, or Firm* — Ked & Associates, LLP

(57) ABSTRACT

An electronic device and a control method thereof are provided. The electronic device and the control method thereof provides a user interface whereby when an electronic device is connected to an external device through short-range communication, an item of the electronic device can be shared with the external device through a simple manipulation on the touchscreen. For example, a particular item displayed on the touchscreen can be easily shared with the external device through only an operation of associating an item desired to be shared with a tray bar.

24 Claims, 37 Drawing Sheets

ELECTRONIC DEVICE AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0149608, filed on 20 Dec., 2012, the contents of which are incorporated by reference herein in their entirety.

TECHNICAL FIELD

The present invention relates to an electronic device and, more particularly, to an electronic device providing a user interface (UI) for sharing items through short-range communication (or near field communication), and a control method thereof.

DISCUSSION OF THE RELATED ART

In line with remarkable advancement of hardware and software technologies in relation to various electronic devices including mobile terminals, electronic devices quickly provide various types of information.

In a related art, in order to share a certain application implemented through an electronic device, a different electronic device should perform complicated processes such as recognizing information regarding the application, e.g., download information of the application and downloading the application. In particular, in case in which a plurality of applications are desired to be shared, the foregoing processes should be performed on the plurality of applications.

Thus, the development and provision of an effective UI allowing for easily shared items in a case in which at least one item is displayed on a touchscreen and a different electronic device exists within a certain near field communication range are required.

SUMMARY

An aspect of the present invention provides an electronic device providing a user interface (UI) allowing for shared items effectively through near field communication (or short-range communication), and a control method thereof.

According to an aspect of the present invention, there is provided an electronic device including: a short-range communication module; a touchscreen configured to display a first layer including at least one item; and a controller configured to establish a communication link with at least one external device through the short-range communication module, display a second layer including at least one item sharable with the external device among at least one item included in the first layer, such that it overlaps with the first layer, and display a tray bar for sharing the at least one sharable item with the at least one external device in one lateral side of the touchscreen corresponding to a direction in which the external device is positioned.

When at least one external device exists in a particular position within a predetermined short-range communication range in the state in which the communication link is established, the controller may display the second layer on the first layer in an overlapping manner.

When a touch input of selecting a particular item among the at least one sharable item is received, the controller may display a guide indicating that the selected item may interact with the tray bar.

When a touch input of selecting a particular item among the at least one sharable item is received and the selected item interacts with the tray bar through a touch input previously determined for the selected item, the controller may transmit a control signal for sharing the selected item with the at least one external device to the at least one external device through the communication link.

The predetermined touch input may include a drag input for including the selected item in the tray bar.

The interaction may be displaying the selected item such that the selected item is attached to the tray bar in response to the drag input.

The interaction may include increasing an area of the tray bar in response to the drag input such that the tray bar includes the selected item.

The control signal may include a signal for controlling the selected item to be downloaded from an external server to the at least one external device.

The electronic device may further include: a sensing unit disposed in at least a portion of a lateral body, wherein when contact with the at least one external device is sensed through the sensing unit, the controller may display the second layer and the tray bar such that they overlap with the first layer.

When a touch input of moving the tray bar interacting with the selected item to the other lateral side of the touchscreen is received, the controller may mirror a screen of the external device and display the same in the second layer.

When a touch input of moving at least one item interacting with the tray bar to the second layer is received, the controller may transmit a control signal for displaying at least one item on the screen of the external device, to the external device through the communication link.

When a touch input of moving the tray bar, which has moved to the other lateral side of the touchscreen, to the original position is received, the controller may terminate the mirroring operation.

The interaction may include a touch input of pushing the selected item outwardly from the touchscreen through the tray bar.

The controller may display a sharing identifier with respect to at least one sharable item.

The short-range communication module may include a near field communication (NFC) module, and when the at least one external device approaches a position within a predetermined distance, an NFC communication link may be established with the at least one external device through the NFC module.

When the second layer is displayed to overlap with the first layer, the controller may deactivate the first layer.

The second layer may include a plurality of pages, and when a scroll input applied to the second layer is received, the controller may change and display a page on the second layer.

The at least one item may include at least one of an application, an image, and a video.

According to another aspect of the present invention, there is provided an electronic device including: a wireless communication unit; a touchscreen; and a controller configured to display at least one item on the touchscreen, display a bar having a predetermined size upon sliding it from one lateral side of the touchscreen when a predetermined touch input is received in a state in which the wireless communication unit is connected to an external device, receive a touch input of associating at least one of at least one item with the bar, mirror a screen of the external device and display the same on the touchscreen when an input of moving the bar to which the at least one item is associated, to the other lateral side of the touchscreen is received, and transmit a remote control signal for sharing the at least one item with the external device, to the external device when an input of moving at least one item associated with the bar to the mirrored screen.

The predetermined touch input may include a touch input of selecting an item sharable with the external device among the at least one item displayed on the touchscreen.

A touch input of associating at least one of the at least one item with the bar may include a touch input of including a particular item in the bar.

According to another aspect of the present invention, there is provided a control method of an electronic device, including: displaying a first layer including at least one item on a touchscreen; establishing a communication link with at least one external device through a short-range communication module; when the at least one external device exists in a particular position within predetermined short-range communication range, displaying a second layer including at least one item sharable with the external device among at least one item included in the first layer, such that the second layer overlaps with the first layer; selecting a particular item among the items included in the second layer; and displaying a tray bar for sharing the selected item with the at least one external device in one lateral side of the touchscreen corresponding to a direction in which the external device is positioned.

According to an embodiment of the present invention, a particular item can be shared through a simple touch input between two devices connected through short-range communication.

Also, according to an embodiment of the present invention, a particular item displayed on a touchscreen can be easily shared with an external device only through an operation of associating an item desired to be shared with a tray bar.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

An electronic device may be described below with reference to the accompanying drawings. In the following description, suffixes "module" and "unit" may be given to components of the electronic device in consideration of only facilitation of description and do not have meanings or functions discriminated from each other.

The electronic device may include a cellular phone, a smart phone, a laptop computer, a digital broadcasting terminal, personal digital assistants (PDA), a portable multimedia player (PMP), a navigation system and/or so on.

Figure 1:
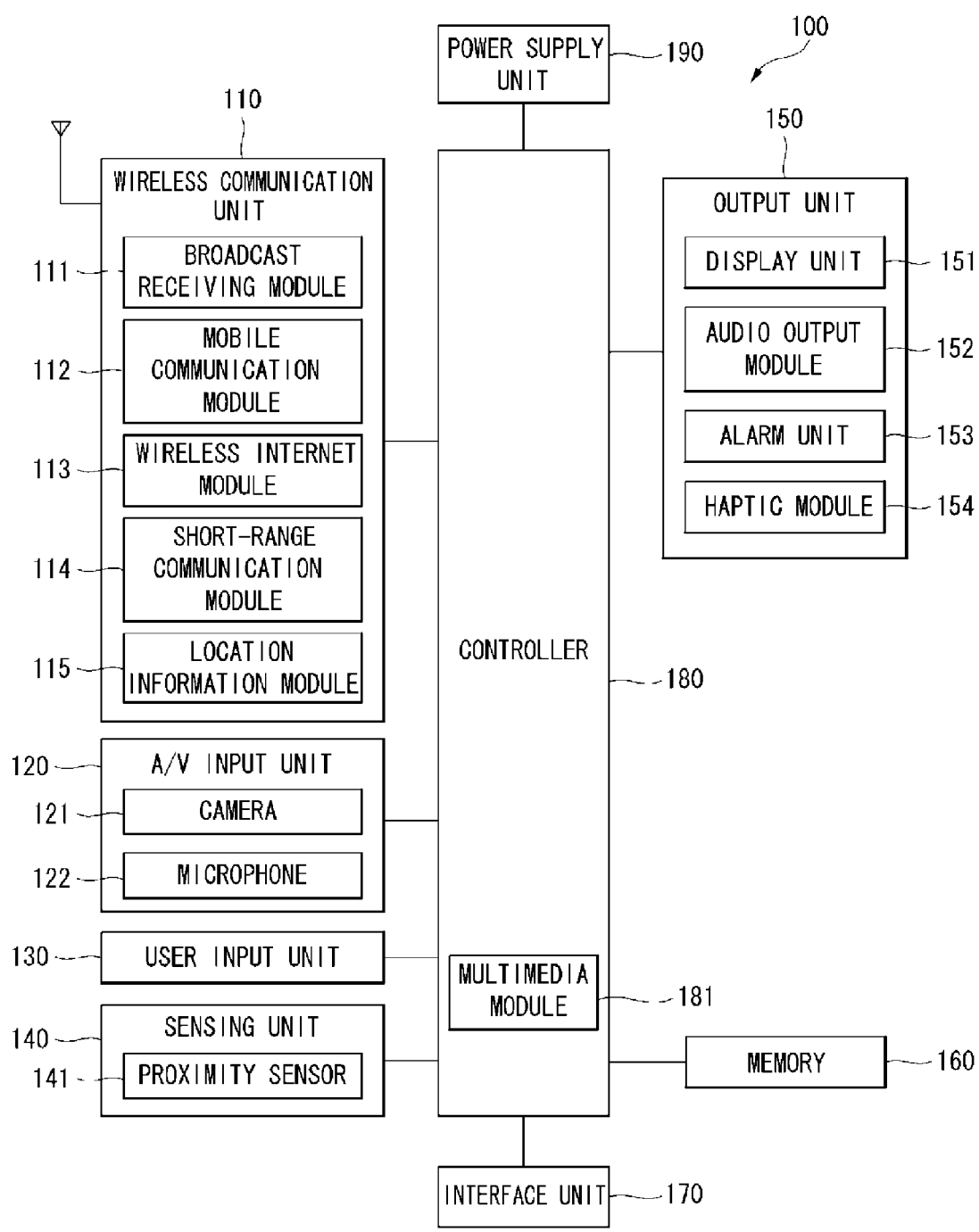
FIG. 1 is a block diagram of an electronic device according to an embodiment of the present invention.

FIG. 1 is a block diagram of an electronic device according to an embodiment. Other embodiments, configurations and arrangements may also be provided.

As shown, the electronic device 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the electronic device 100 may vary. Components of the electronic device 100 may now be described.

The wireless communication unit 110 may include at least one module that enables radio communication between the electronic device 100 and a radio communication system or between the electronic device 100 and a network in which the electronic device 100 is located. For example, the wireless communication unit 110 may include a broadcasting receiving module 111, a mobile communication module 112, a wireless Internet module 113, a short-range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the electronic device 100 or may be externally attached to the electronic device 100. Wireless LAN (WLAN or Wi-Fi), wireless broadband (Wibro), world interoperability for microwave access (Wimax), high speed downlink packet access (HSDPA) and so on may be used as a wireless Internet technique.

The short-range communication module 114 may correspond to a module for short-range communication. Further, Bluetooth®, radio frequency identification (RFID), infrared data association (IrDA), ultra wideband (UWB) and/or Zig-Bee® may be used as a short-range communication technique.

The location information module 115 may confirm or obtain a location or a position of the electronic device 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touchscreen.

The image frames processed by the camera 121 may be stored in the memory 160 or may be transmitted to an external device through the wireless communication unit 110. The electronic device 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the electronic device 100 from a user. The user input unit 130 may include a keypad, a dome switch, a touch pad (constant voltage/capacitance), a jog wheel, a jog switch and/or so on.

The sensing unit 140 may sense a current state of the electronic device 100, such as an open/close state of the electronic device 100, a position of the electronic device 100, whether a user touches the electronic device 100, a direction of the electronic device 100, and acceleration/deceleration of the electronic device 100, and the sensing unit 140 may generate a sensing signal for controlling operation of the electronic device 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor. The sensing unit 140 may sense a motion of the electronic device 100.

The output unit 150 may generate visual, auditory and/or tactile output, and the output unit 150 may include the display 151, an audio output module 152, an alarm 153 and a haptic module 154. The display 151 may display information processed by the electronic device 100. The display 151 may display a user interface (UI) and/or a graphic user interface (GUI) related to a telephone call when the electronic device 100 is in the call mode. The display 151 may also display a captured and/or received image, a UI or a GUI when the electronic device 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the electronic device 100) through the transparent area of the body of the electronic device 100 that is occupied by the display 151.

The electronic device 100 may also include at least two displays 151. For example, the electronic device 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touchscreen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor (of the sensing unit 140) may be located in an internal region of the electronic device 100, surrounded by the touchscreen, and/or near the touchscreen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the electronic device 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touchscreen may be constructed such that proximity of a pointer is detected through a variation in an electric field according to the proximity of the pointer. The touchscreen (touch sensor) may be classified as a proximity sensor.

For ease of explanation, an action of the pointer approaching the touchscreen without actually touching the touchscreen may be referred to as a proximity touch and an action of bringing the pointer into contact with the touchscreen may be referred to as a contact touch. The proximity touch point of the pointer on the touchscreen may correspond to a point of the touchscreen at which the pointer is perpendicular to the touchscreen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touchscreen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the electronic device 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the electronic device 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The electronic device 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touchscreen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The electronic device 100 may also operate in relation to a web storage that performs a storing function of the memory 160 on the Internet.

The interface 170 may serve as a path to external devices connected to the electronic device 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the electronic device 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the electronic device 100 through a port of the interface 170.

The interface 170 may also be a path through which power from an external cradle is provided to the electronic device 100 when the electronic device 100 is connected to the external cradle or a path through which various command signals input by the user through the cradle are transmitted to the electronic device 100. The various command signals or power input from the cradle may be used as signals for confirming whether the electronic device 100 is correctly set in the cradle.

The controller 180 may control overall operations of the electronic device 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touchscreen as characters or images. The power supply 190 may receive external power and internal power and provide power required for operations of the components of the electronic device 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

The proximity sensor 141 described with reference to FIG. 1 may now be explained in detail with reference to FIG. 2.

Figure 2:
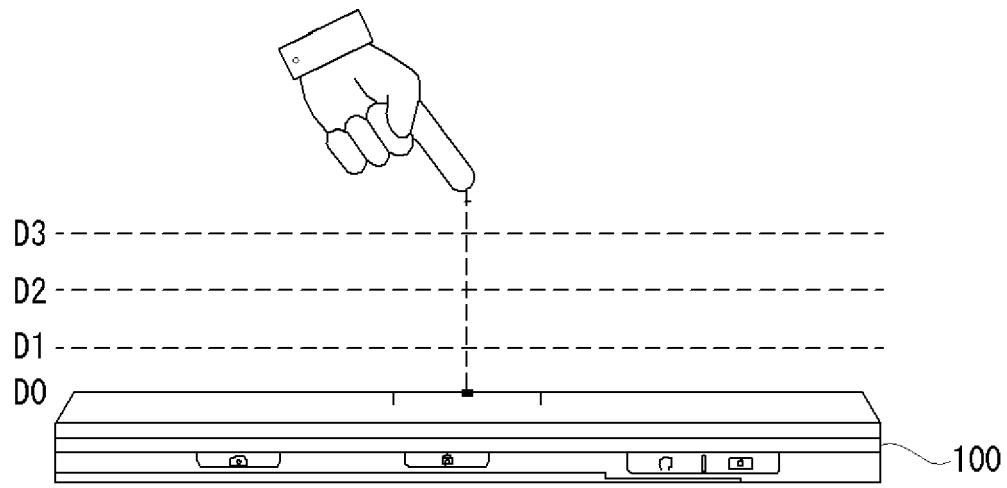
FIG. 2 is a diagram relating to a proximity depth of a proximity sensor.

FIG. 2 is a diagram relating to a proximity depth of a proximity sensor. Other embodiments, arrangements and configurations may also be used.

As shown in FIG. 2, when a pointer, such as a user's finger, a pen, a stylus and the like, approaches the touchscreen, the proximity sensor 141 provided within or in a vicinity of the touchscreen may detect the approach of the pointer and then output a proximity signal.

The proximity sensor 141 may output a different proximity signal according to a distance between the pointer and the proximity-touched touchscreen (hereafter referred to as a proximity depth).

FIG. 2 shows a cross-section of the touchscreen provided with a proximity sensor capable of detecting three proximity depths, for example. A proximity sensor that identifies less than 3 proximity depths or more than 4 proximity depths may also be provided.

If the pointer fully contacts the touchscreen (d0), a contact touch may be recognized. If pointer is spaced apart from the touchscreen by a distance less than d1, a proximity touch to a first proximity depth may be recognized. If the pointer is spaced apart from the touchscreen by a distance between d1 and d2, a proximity touch to a second proximity depth may be recognized. If the pointer is spaced apart from the touchscreen in a distance less than d3 or equal to or greater than d2, a proximity touch to a third proximity depth may be recognized. If the pointer is spaced apart from the touchscreen in a distance equal to or greater than d3, a proximity touch is released.

The controller 180 may recognize the proximity touch as one of various input signals according to proximity depth and position of the pointer. The controller 180 may perform various operation controls according to various input signals.

Figure 3:
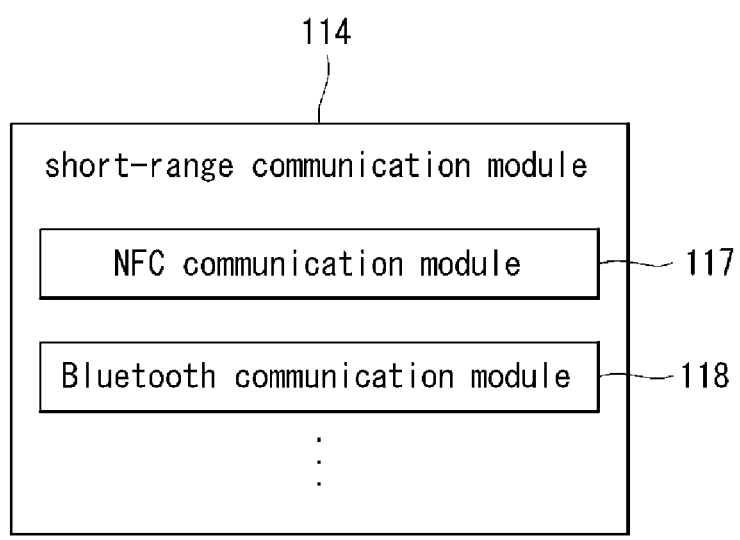
FIG. 3 is a detailed block diagram of a near field communication module of an electronic device according to an embodiment of the present invention.

FIG. 3 is a detailed block diagram of a near field communication module of an electronic device according to an embodiment of the present invention. Referring to FIG. 3, the short-range communication module 114 may include a near field communication (NFC) module 117, a Bluetooth communication module 118, and the like.

The NFC module 117 may perform data communication with devices located within a distance of 10 centimeters (preferably, within 4 centimeters) by using a very short-range contactless data transfer technology) in relation to radio frequency identification (RFID). An electronic device employing the NFC technology may communicate with a different electronic device employing the NFC technology in at least one of a reader mode, a card emulation mode, and a peer-to-peer mode, for example. The NFC module 117 will be described in detail with reference to FIG. 4.

The Bluetooth communication module 118 may perform data communication with devices within a radius of 10 meters to 100 meters by using Bluetooth, one of near-field communication (NFC) standards. For reference, Bluetooth is near field wireless networking technology developed by the Bluetooth Special Interest Group (SIG).

The block diagram illustrated in FIG. 3 is merely an example of the short-range communication module 114 of the electronic device 100. The components are not essential. The short-range communication module 114 may include greater or fewer components than those illustrated in FIG. 3.

Figure 4:
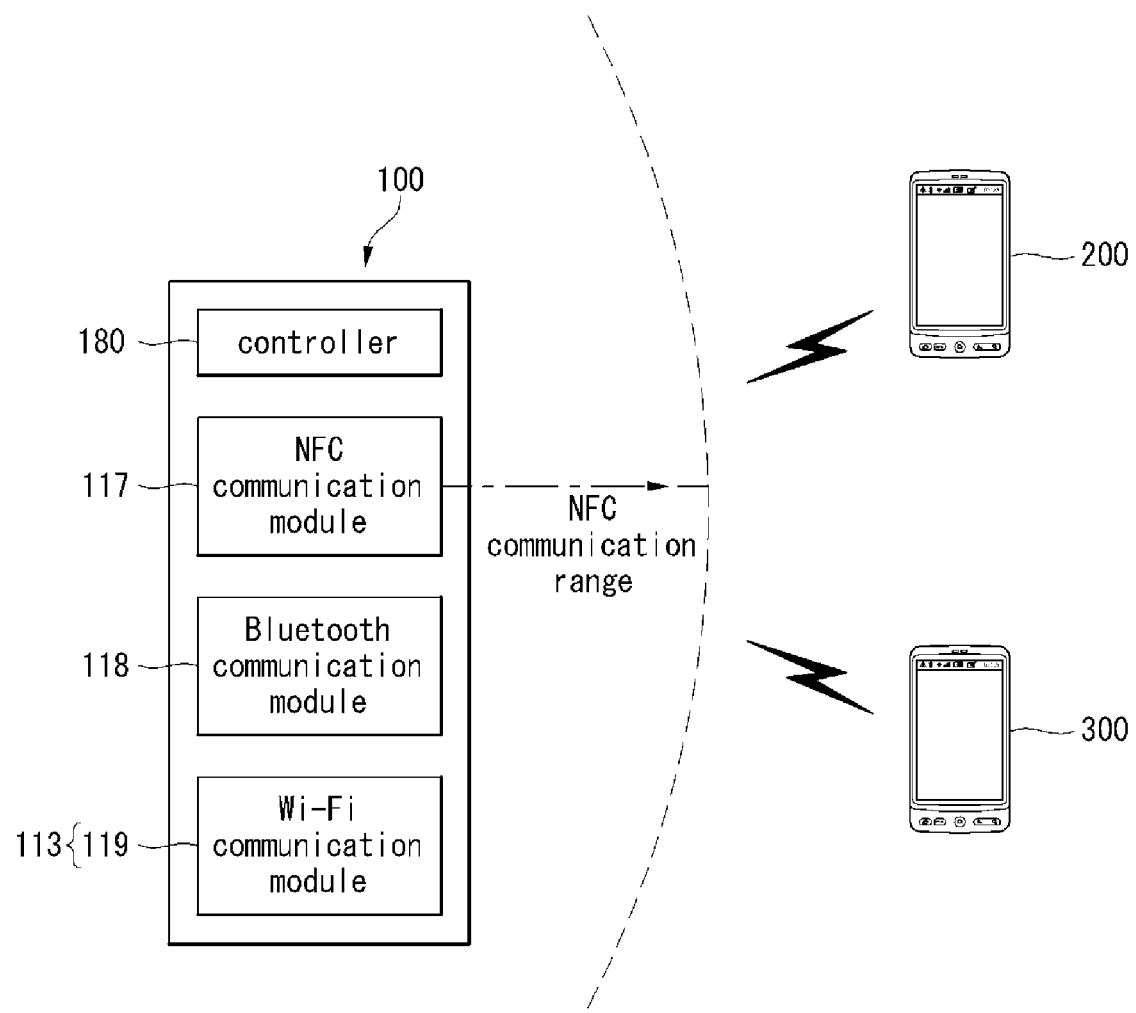
FIG. 4 is a view illustrating a system environment including electronic devices according to an embodiment of the present invention.

FIG. 4 is a view illustrating a system environment including electronic devices according to an embodiment of the present invention. As illustrated in FIG. 4, it can be seen that the system environment may include the electronic device 100 and one or more different electronic devices 200 and 300 which may establish an NFC link with the electronic device 100.

Here, the components of the system environment are not essential and may include more or fewer components than those illustrated in FIG. 4. Also, FIG. 4 illustrates only components required for establishing a communication link to largely describe the characteristics of establishing a communication link of the electronic device 100

In FIG. 4, the system environment is implemented by mobile terminals 100, 200, and 300, but the electronic devices 100, 200, and 300 mentioned in the present disclosure may be arbitrary electronic devices supporting NFC. Namely, the electronic devices 100, 200, and 300 may be mobile terminals such as a cellular phone, a smart phone, a tablet PC, or the like, supporting NFC communication or may be electronic devices such as a printer, a TV, a DTV, a computer, an audio device, or the like. Hereinafter, an electronic device having an NFC function may be referred to as an NFC electronic device.

Also, the electronic device 100 in FIG. 4 may establish an NFC link with the other electronic devices 200 and 300 on the basis of an NFC technology, a type of short-range communication technology, but the present invention is not limited thereto. For example, the electronic device 100 may establish a wireless communication link with the other electronic devices 200 and 300 by using a short-range wireless communication technology other than the NFC technology.

Referring back to FIG. 4, the electronic device 100 includes a controller 180, an NFC module 117, a Bluetooth communication module 118, and a Wi-Fi communication module 119.

The controller 180 may control a component of the electronic device 100. The NFC module 117 may enable the electronic device 100 to establish an NFC link with the other electronic devices 200 and 300 supporting NFC communication. The NFC module 117 may be an NFC forum device. In this document, the NFC module 117 may be referred to as a short-range communication unit.

As illustrated in FIG. 4, the NFC module 117 may establish an NFC link through tagging with NFC modules of the other electronic devices 200 and 300 within an NFC range.

The NFC module 117 may communicate with the NFC modules of the other electronic devices 200 and 300 in various modes. For example, the various modes may include a card emulation mode, a reader mode, a peer-to-peer mode.

When the NFC module 117 of the electronic device 100 operates in the emulation mode, the NFC module 117 may serve as a card, namely, as a tag. In this case, the NFC modules of the other electronic devices 200 and 300 may operate in the reader mode and obtain data from the NFC module 117 of the electronic device 100.

When the NFC module 117 of the electronic device 100 operates in the reader mode, the NFC module 117 may serve as a reader. In this case, the NFC module 117 of the electronic device 100 may obtain data from the NFC modules of the other electronic devices 200 and 300 operating in the emulation mode.

When the NFC module 117 of the electronic device 100 operates in the peer-to-peer mode, the NFC module 117 may exchange data with the NFC modules of the other electronic devices 200 and 300.

A mode of the NFC module 117 may be determined according to a predetermined reference. For example, a mode of the NFC module 117 may be set according to a user input or a predetermined algorithm.

After the electronic device 100 establishes an NFC link through the NFC module 117 with the other electronic devices 200 and 300, the electronic device 100 may establish a different type of communication link than the NFC link through the Bluetooth communication module 118 and/or the Wi-Fi communication module 119. Then, even if the NFC link is broken (or disconnected), the electronic device 100 may continuously perform data communication with the other electronic devices 200 and 300 through the Bluetooth communication link and/or Wi-Fi communication link.

In this document, the sequential processes of establishing a different communication link to allow the electronic device 100 to continue to communicate with the other electronic devices 200 and 300 by using a different wireless communication technique after establishing the NFC link will be referred to as handover.

Referring to FIG. 4, it can be seen that the electronic device 100 may perform handover from the NFC link to the Bluetooth communication link or the Wi-Fi communication link, but the present invention is not limited thereto. For example, the electronic device 100 may perform handover to various other communication links such as a radio frequency identification (RFID) communication link, a wireless gigabit (Wi-Gig) communication link, or the like.

Although not shown in FIG. 4, the other electronic devices 200 and 300 may include components corresponding to those of the electronic device 100. Namely, the other electronic devices 200 and 300 may include a controller, an NFC module, a Bluetooth communication module, and a Wi-Fi communication module.

In other words, handover is performed when the electronic device 100 establishes a different communication link to perform data communication in a state in which the electronic device 100 has established an NFC link with the other electronic devices 200 and 300. In this case, the user may easily establish an NFC link through NFC tagging between the electronic device 100 and the other electronic devices 200 and 300, and thereafter, it may change a communication means to a substitute communication link appropriate for remote and/or high capacity data transmission, relative to the NFC link.

Figure 5:
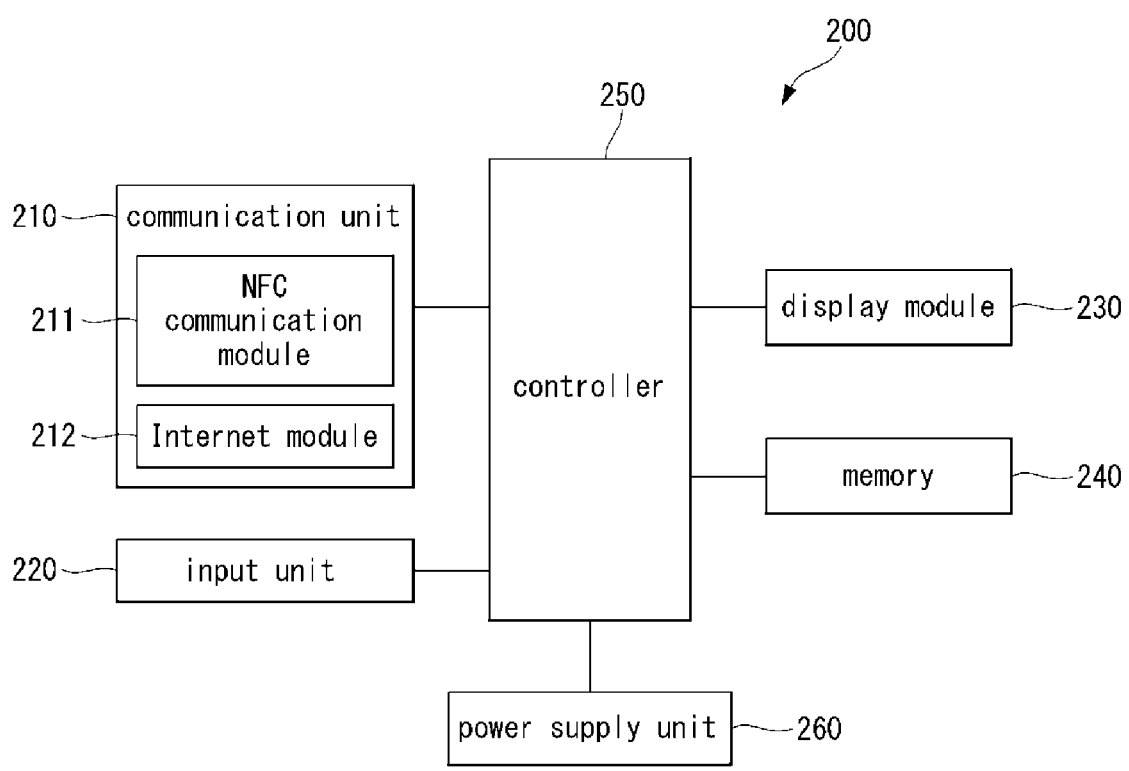
FIG. 5 is a block diagram of an external device in relation to embodiments of the present invention.

FIG. 5 is a block diagram of the external device 200 in relation to embodiments of the present invention.

Referring to FIG. 5, the external device 200 may include a communication unit 210, an input unit 220, a display unit 230, a memory 240, a controller 250, a power supply unit 260, and the like. The components illustrated in FIG. 5 are not essential and the external device 200 may be implemented with more or fewer components.

Hereinafter, the components will be described one by one.

The communication unit 210 may include a short-range communication module 211, an Internet module 212, and the like.

The short-range communication module 211 may be an NFC communication module and may be a module for performing NFC communication with a different electronic device.

The Internet module 212 may be a module for accessing the Internet wirelessly or through a fixed line. The external device 212 may communicate with an external server through the Internet module 212. The external device 200 may perform an operation of downloading at least one item shared with the electronic device 100 from the Internet module 212.

The input unit 220 may be a unit for receiving an input from the outside, which may include a camera for inputting an external image, a microphone for receiving an external audio signal, a user input unit for receiving a user's control input, and the like.

The user input unit may include a keypad, a dome switch, a touch pad, a jog wheel, a jog switch, and the like.

The display module 230 displays information processed in the external device 200.

Also, the display module 230 may display a user interface for sharing at least one item with the foregoing electronic device 100. Like the foregoing electronic device 100, the display module 230 of the external device 200 may be implemented as a touchscreen that may be used as an input device as well as an output device.

The memory 240 may store a program for an operation of the controller 250 of the external device 200 or may store at least one item shared with the electronic device 100. The memory 240 may download at least one item shared with the foregoing electronic device 100 from an external server, or the like, and store the same therein.

The controller 250 generally controls a general operation of the external device 200. For example, the controller 250 may perform controlling and processing in relation to sharing of at least one item with the foregoing electronic device 100.

The power supply unit 260 may receive external power or internal power and supply power required for an operation of each component under the control of the controller 250.

Hereinafter, embodiments of the present invention will be described.

In an embodiment of the present invention, the display unit 151 is assumed as the touchscreen 151. As mentioned above, the touchscreen 151 may perform both an information display function and an information input function. However, it should be appreciated that the present invention is not limited thereto. Also, a touch mentioned in this document may include both a contact touch and a proximity touch. It should also be appreciated that the display module 230 of the foregoing external device 200 is assumed as a touchscreen.

Figure 6:
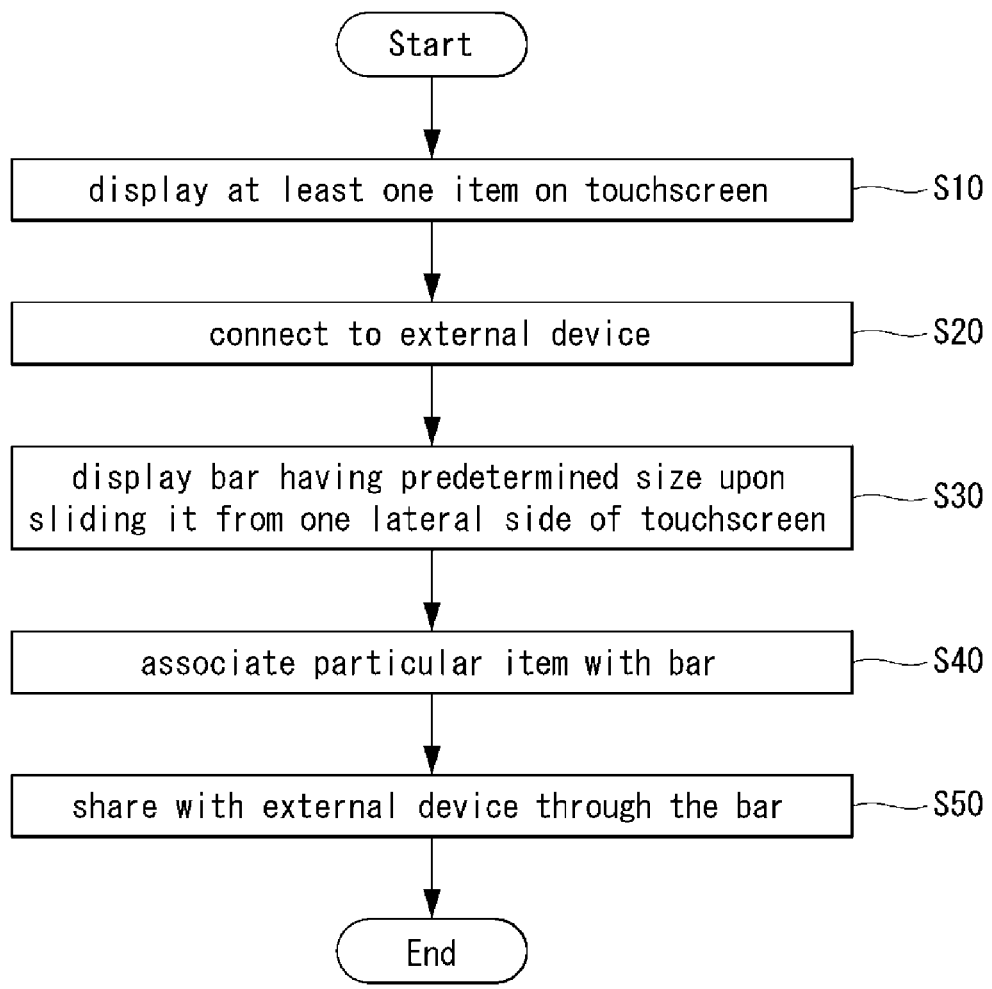
FIG. 6 is a flow chart of a control method of an electronic device according to a first embodiment of the present invention.

FIG. 6 is a flow chart of a control method of an electronic device according to a first embodiment of the present invention. The control method of an electronic device according to the first embodiment of the present invention may be implemented in the electronic device 100 described above with reference to FIGS. 1 and 2. Hereinafter, the control method of an electronic device according to the first embodiment of the present invention and operations of the electronic device 100 for implementing the same will be described in detail.

The controller 180 of the electronic device 100 displays at least one item on the touchscreen 151 (S10).

The at least one item may include an application, an image, video contents, and the like, operable in the electronic device. The at least one item may include a widget icon. The at least one item may include every item which is generated in the electronic device 100 or which may be downloaded from the outside, rather than being limited to the foregoing examples. The controller 180 may display the at least one item on the touchscreen 151 in the form of a graphic user interface (GUI). Thus, when a touch input with respect to a particular GUI is received, the controller may execute a particular function corresponding to the GUID.

The controller 180 may connect the electronic device 100 to an external device.

The controller 180 may be connected to an external device through short-range communication. The short-range communication may include NFC communication, Bluetooth communication, and the like. For example, in a case in which the electronic device 100 includes an NFC module and the external device also includes an NFC module, when the electronic device 100 and the external device approach within a predetermined distance (e.g., 4 centimeters), a short-range communication link may be established between the two devices. Data communication may be performed through the communication link.

When a short-range communication link is established between the electronic device 100 and the external device, the controller 180 may display a bar having a predetermined size through sliding from one side of the touchscreen 151 (S30).

When the bar appears in the touchscreen 151, it means that the electronic device 100 and the external device are connected.

The bar may appear in one side of the touchscreen 151. The bar may be display in a boundary region of the touchscreen 151. In the forgoing example, the configuration in which the bar is displayed in a lateral region of the touchscreen 151 has been described as an example, but the present invention is not limited thereto. For example, the controller 180 may display the bar in a certain region of the touchscreen 151.

As the bar is displayed on the touchscreen 151, at least one item and the bar may be displayed together on the touchscreen 151. The bar may be displayed with the item in an overlapping manner.

Thereafter, the controller 180 may receive an input of associating a particular item among the at least one item displayed on the touchscreen 151 with the bar (S40), and control the particular item to be shared with the external device through the bar in response to the input (S50).

Here, the associating of the particular item with the bar may mean that at least one region of the particular item is displayed with the bar in an overlapping manner. Also, it may mean that the particular item is displayed to be included in the bar. The configuration of associating the particular item with the bar or the input of associating the particular item with the bar may be variously modified to be implemented, and it should be appreciated that the foregoing example is merely illustrative, not limitative.

In controlling the particular item to be shared with the external device through the bar, the particular item displayed in the electronic device 100 may be controlled to be displayed in the external device. Also, a control signal for downloading the particular item displayed in the electronic device 100 from an external server to the external device may be transmitted to the external device and/or the external server.

When the control signal is received, the external device may perform a command included in the control signal.

In the first embodiment of the present invention as described above, the example in which at least one item displayed on the touchscreen 151 is associated with a predetermined bar displayed through the touchscreen 151 to thereby allow the associated item to be shared with an external device has been described.

Hereinafter, a specific user interface for sharing a certain item with an external device will be described.

Figure 7:
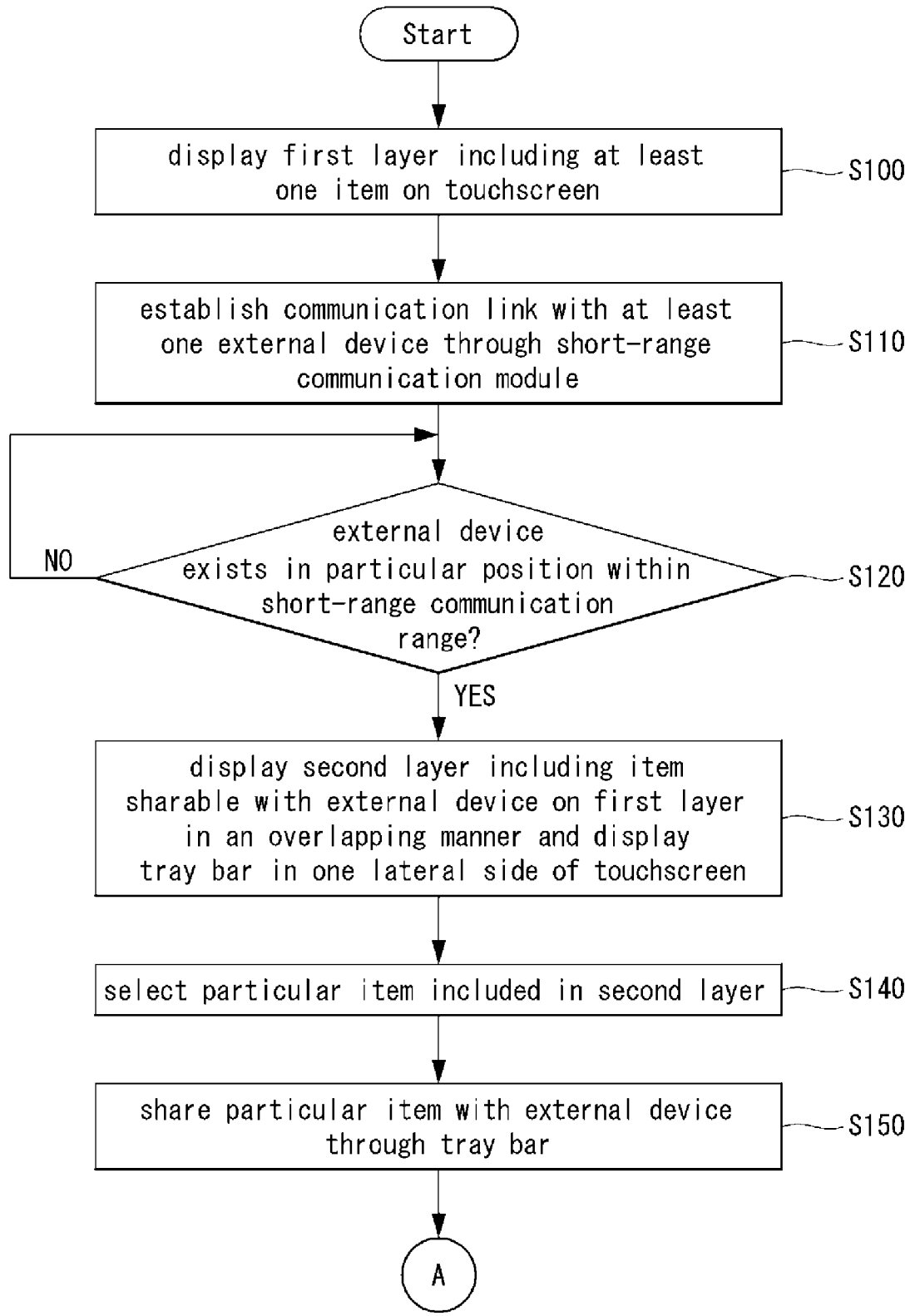
FIG. 7 is a flow chart of a control method of an electronic device according to a second embodiment of the present invention.

FIG. 7 is a flow chart of a control method of an electronic device according to a second embodiment of the present invention. The control method of an electronic device according to the second embodiment of the present invention may be implemented in the electronic device 100 described above with reference to FIG. 1. The control method of an electronic device according to the first embodiment of the present invention and the operation of the electronic device for implementing the same will be described in detail.

Referring to FIG. 7, the controller 810 may display a first layer including at least one item on the touchscreen (151) (S100).

Here, the layer may be used to have the same concept as that of a page. The page may include a plurality of pages, and at least one item may be displayed in each of the plurality of pages. The page may include a plurality of pages and may be scrolled such that a particular page is displayed on the touchscreen 151 having a predetermined size.

Meanwhile, layers may not be one-dimensional and may be displayed in an overlapping manner. For example, the first layer may be overlapped with a second layer so as to be displayed, and the second layer may be displayed from sliding from one side of the first layer in a state in which the first layer is displayed.

Figure 8:
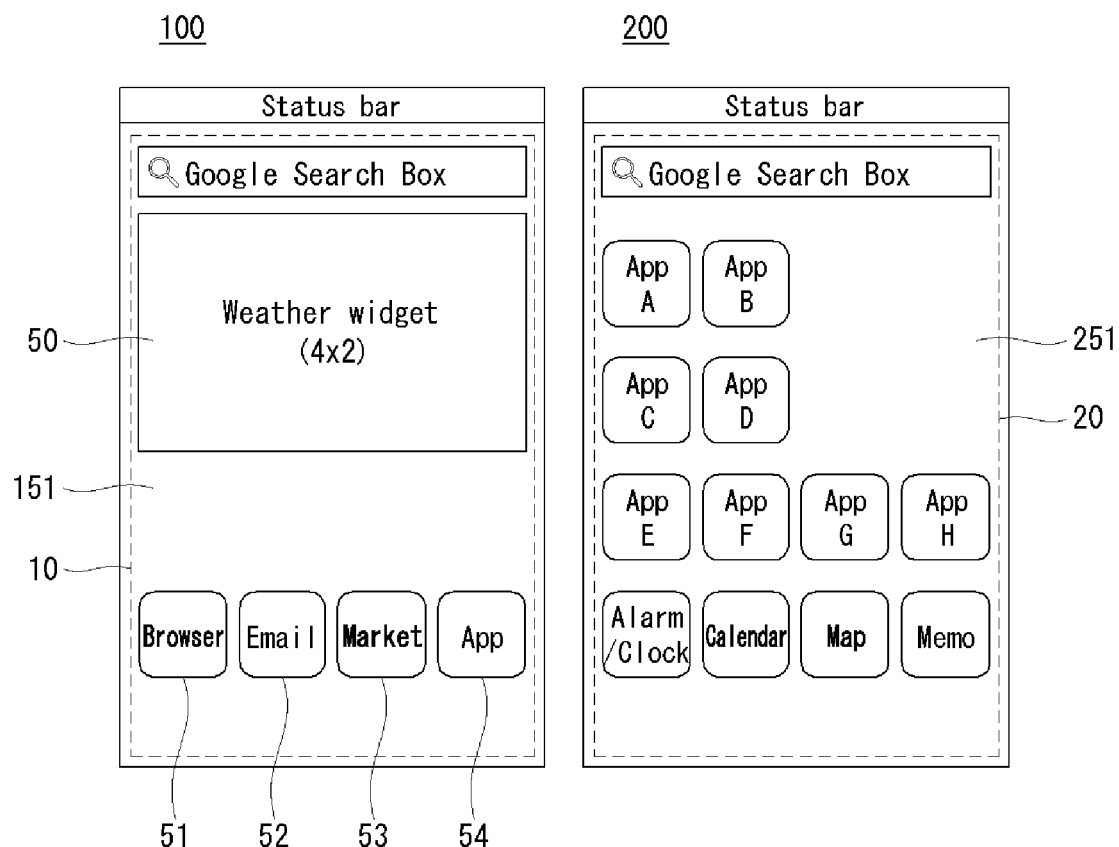
FIG. 8 is a view illustrating operation S100 of FIG. 7.

FIG. 8 is a view illustrating operation S100 of FIG. 7.

Referring to FIG. 8, the controller 180 may display at least one item 50, 51, 52, 53, and 54 in the first layer 10.

Meanwhile, before being connected to the electronic device 100 through short-range communication, the external device 200 may also display at least one item (App A, App B, . . . , App H, Alarm Clock. Calendar, Map, Memo) in the second layer 20. Of course, the second layer 20 may be displayed on the display unit 251 of the external device as described above.

In a state in which predetermined items are displayed on the displays of the electronic device 100 and the external device 200, the electronic device 100 may be connected to the external device 200 (S110). As described above, the electronic device 100 may include the NFC module 117 (please see FIG. 3) and establish an NFC link with the external device 200 through the NFC module 117.

Figure 9:
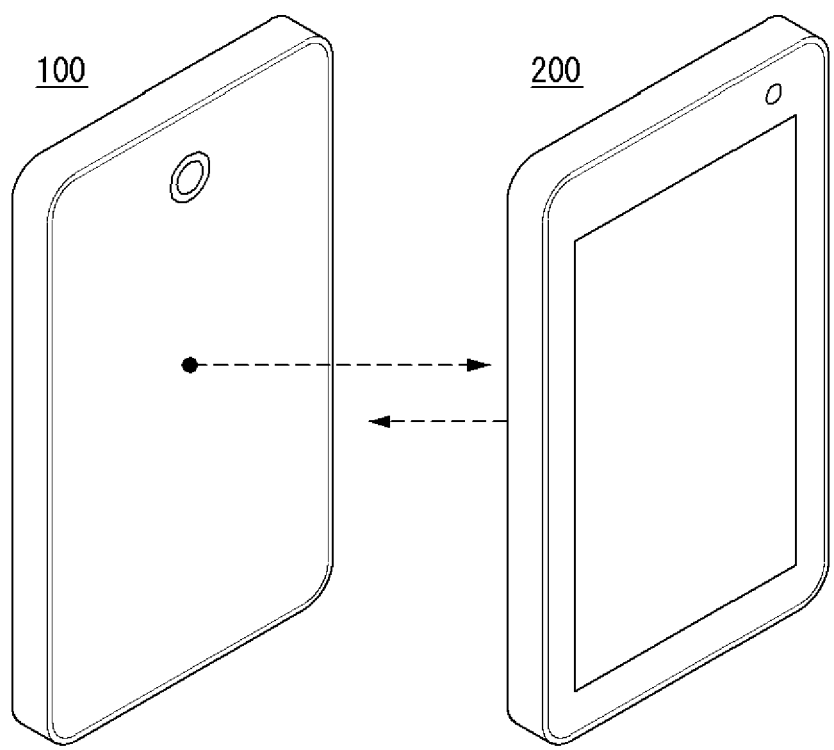
FIG. 9 is a view illustrating operation S110 of FIG. 7.

For example, as illustrated in FIG. 9, when a rear body of the electronic device 100 and that of the external electronic device 200 approach each other to be within a predetermined distance (e.g., 4 centimeters), the electronic device 100 may operate as an NFC tag or reader. When the electronic device 100 operates as an NFC tag, the external electronic device 200 may operate as an NFC reader, and when the electronic device 100 operates as an NFC reader, the external electronic device 200 may operate as an NFC tag.

After the electronic device 100 and the external device 200 establish a communication link (e.g., a short-range communication link), when the external device 200 exists in a particular position within the short-range communication range (S120), the controller 180 may display a second layer including items sharable with the external device 200 such that it overlaps with the first layer. Also, the controller 180 may display a tray bar in one side of the touchscreen 151 (S130).

Figure 10:
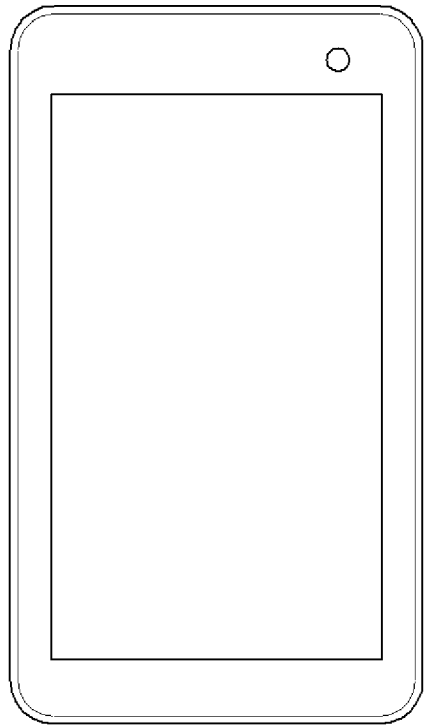
FIG. 10 is a view illustrating operation S120 of FIG. 7.
Figure 10:
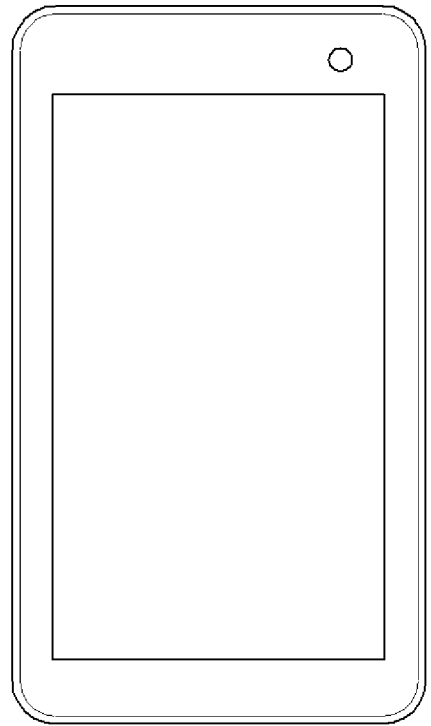

For example, as illustrated in FIG. 10, the electronic device 100 and the external device 200 may be placed side by side. In this case, as mentioned above, the second layer may be displayed to overlap with the first layer.

Meanwhile, the electronic device 100 may include a sensing unit formed in at least a portion of a lateral body. The sensing unit may include a pressure sensor for sensing contact between the electronic device 100 and the external device 200.

However, the sensing unit is not limited to the foregoing pressure sensor and any sensing module that may be able to recognize a relative position of the external device 200 on the basis of the electronic device 100 may be applied.

When the controller 180 senses contact with at least one external device is detected through the sensing unit, the electronic device 100 may enter a mode for sharing an item with the external device. In the mode for sharing an item, the second layer and the tray bar may be displayed to overlap with the first layer.

Figure 11:
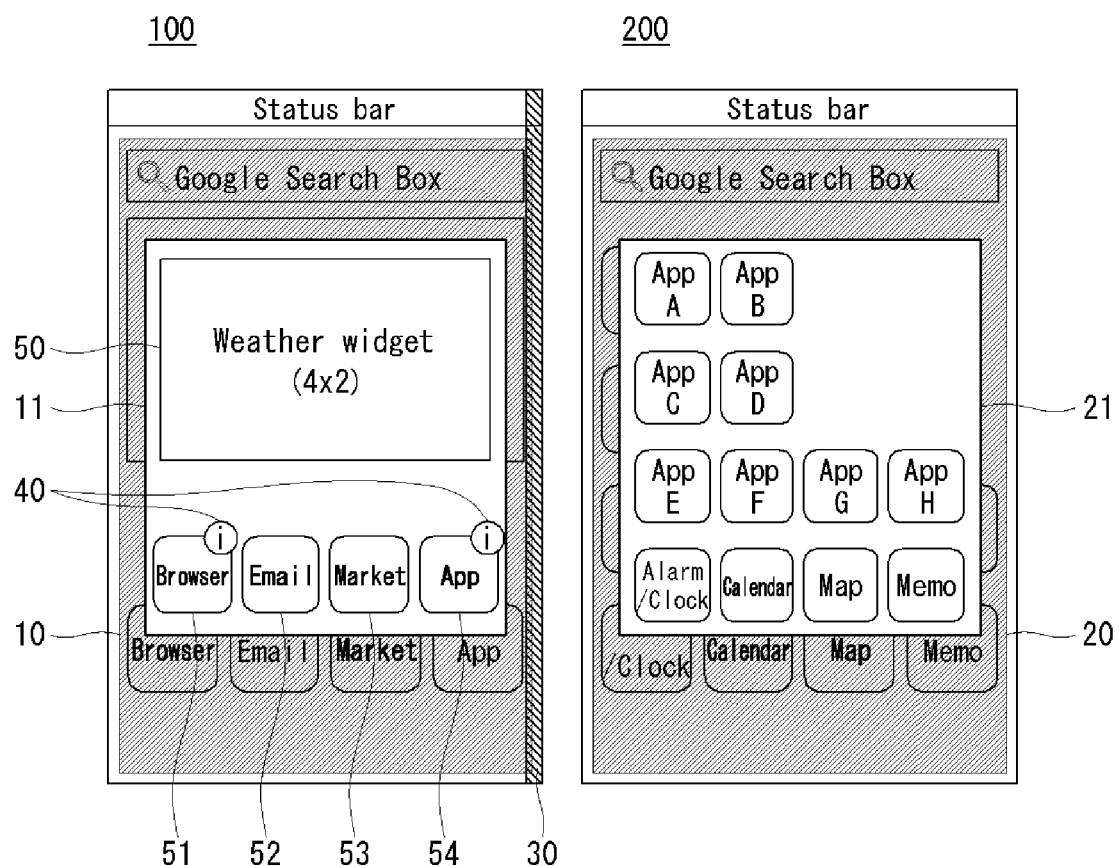
FIG. 11 is a view illustrating operation S130 of FIG. 7.

Referring to FIG. 11, the second layer 11, the second layer 11 may be an additional layer having the same item array as the items included in the first layer 10. The second layer 11 may include all the items included in the first layer 10 and may have a different item array structure. Also, unlike the first layer 10, the second layer 11 may display a shared item identification mark 40 indicating that at least one item included in the second layer 11 can be shared with the external device 200, together with the item.

The shared item identification mark 40 may be displayed to have a predetermined size in an upper end portion of the icon, whereby the user may recognize that the item to which the identification mark is tagged can be shared with the external device 200.

Here, the second layer 11 may be displayed to overlap with the first layer 10. Also, in the mode for sharing an item, the first layer 10 may be deactivated and only the second layer 11 may be displayed in an activated state.

In the state in which the first layer 10 is deactivated, the controller 180 does not respond to a touch input applied to the first layer 10. Also, in a state in which the second layer 20 is activated, the controller 180 responds to a touch input applied to the second layer 20.

When the electronic device 100 enters the mode for sharing an item, the controller 180 may display a tray bar 30, sliding from one side of the touchscreen, 151, together with the second layer 11.

Meanwhile, when the electronic device 100 enters the mode for sharing an item, the external device 200, which establishes a short-range communication link with the electronic device 100 and is connected to the electronic device 100, may also enter the mode for sharing an item. The external device 200 may display the second layer 21 such that it overlaps with the first layer 20 displayed on the display unit of the external device 200. As described above, a second layer 21 of the external device 200 may also have the same item array as that of the first layer 20.

In the following description, it is assumed that a particular item included in the electronic device 100 is shared by the external device 200 connected to the electronic device 100 by a short-range communication link. Thus, the item as a sharing target may be an item displayed in the electronic device 100 and the external device 200 may not store the item as the sharing target.

The controller 180 may display the tray bar 30 in one side of the touchscreen 151 (S130). The tray bar 30, associated with the item as a sharing target, may serve to transmit sharing information of the item as a sharing target to the external device. The tray bar will be described in detail with reference to FIGS. 12 through 17.

Figure 12:
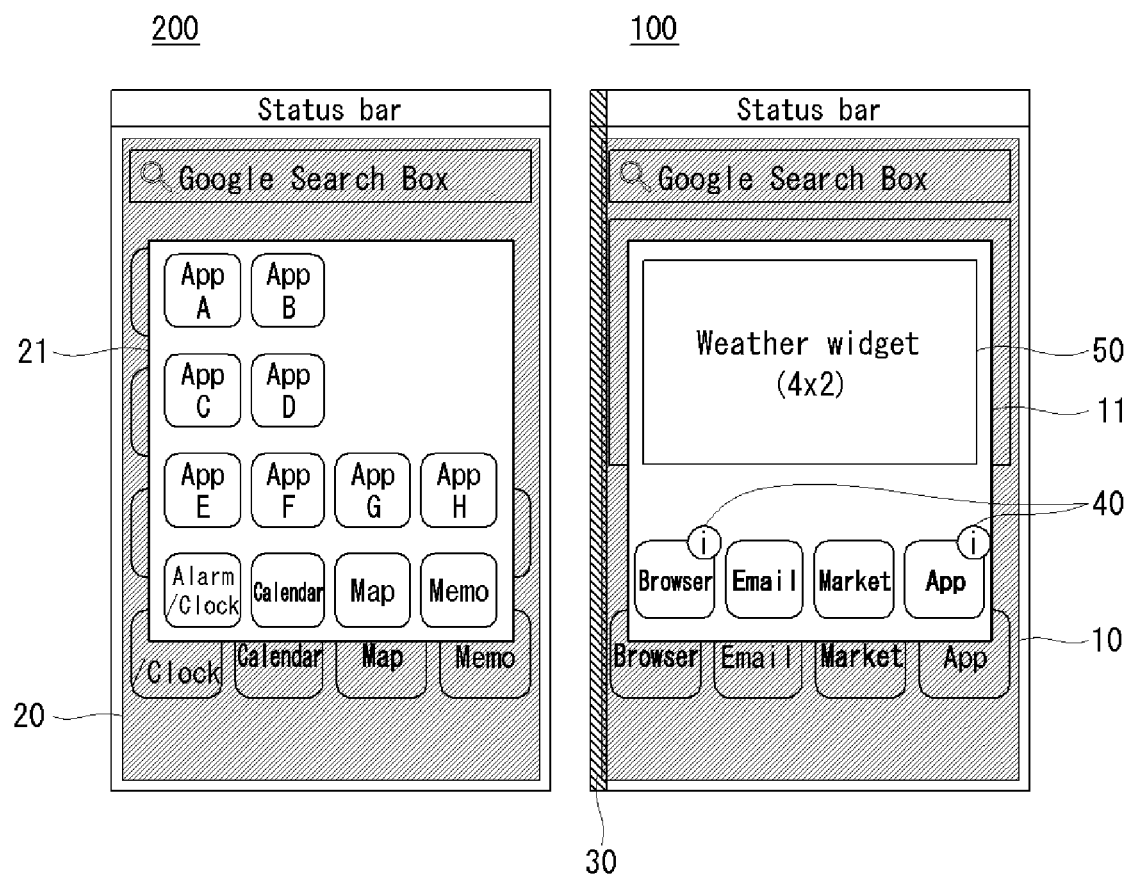
FIGS. 12 and 13 are views illustrating an example of controlling displaying of a tray bar according to a direction in which an external device is positioned.
Figure 13:
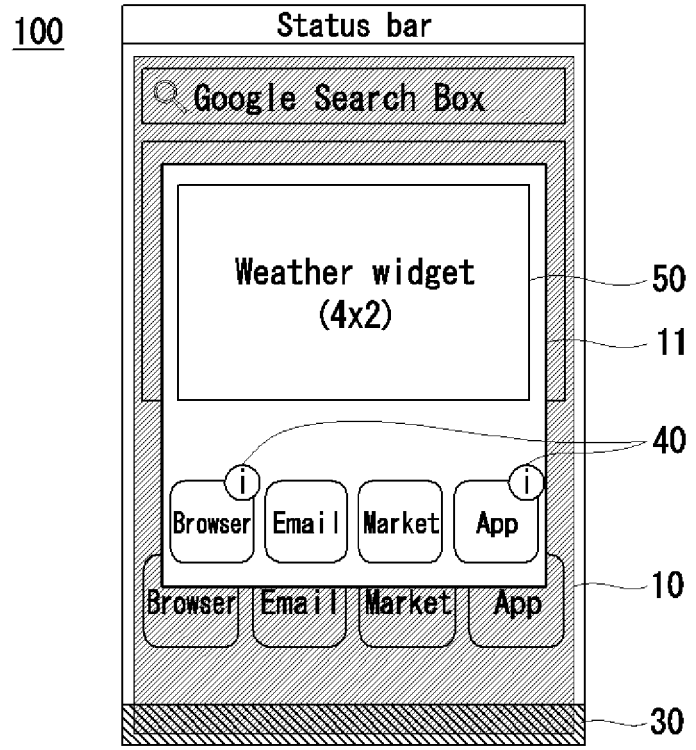
Figure 13:
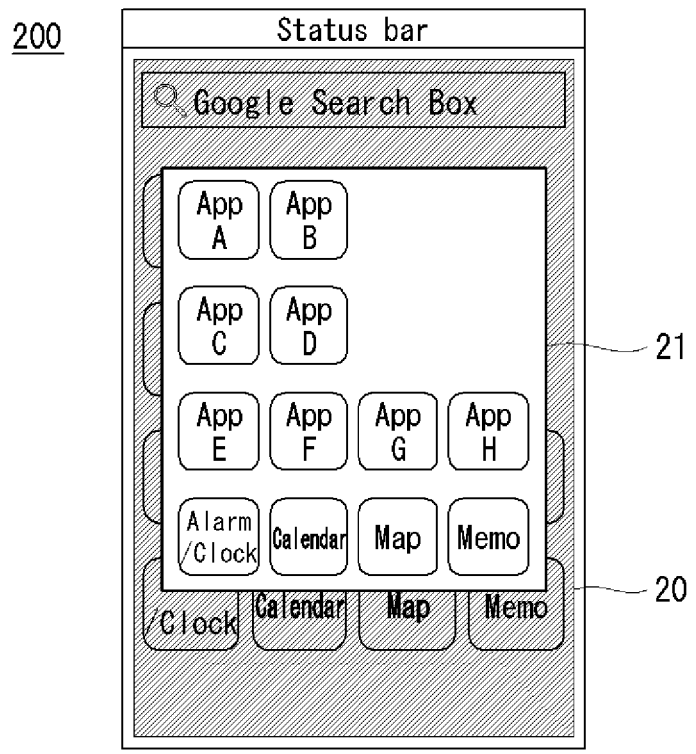

FIGS. 12 and 13 are views illustrating an example of controlling displaying of a tray bar according to a direction in which an external device is positioned.

The controller 180 may recognize a direction in which the external device 200 exists through the pressure sensor. Thus, the controller 180 may display the tray bar in one side of the touchscreen 151 corresponding to the direction in which the external device 200 exists on the touchscreen 151. The pressure sensor may be provided in the entirety of the body of the electronic device 100.

For example, referring to FIG. 12, when the external device 200 is in contact with the left of the electronic device 100, the pressure sensor may recognize that the external device 200 exists in the left direction of the electronic device 100 and display the tray bar in the left boundary of the touchscreen 151.

Also, for example, referring to FIG. 13, when the external device 200 is in contact with the bottom of the electronic device 100, the pressure sensor may recognize that the external device 200 is in a downward direction of the electronic device 100 and may display the tray bar in a lower boundary of the touchscreen 151.

Meanwhile, the external device 200 may also include the foregoing pressure sensor in a lateral portion of the body. Thus, the external device 200 may also recognize a direction in which it is in contact with the electronic device 100 and display a tray bar of the external device 200 on the display unit of the external device 200.

For example, in a case in which a left body of the electronic device 100 and a left body of the external device 200 are in contact, the pressure sensors of the respective devices sense the contact between the devices. The controller 180 of the electronic device 100 may display a tray bar in a right boundary of the touchscreen 151 and a controller (not shown) of the external device 200 may display a tray bar in a left boundary of the display unit.

Figure 14:
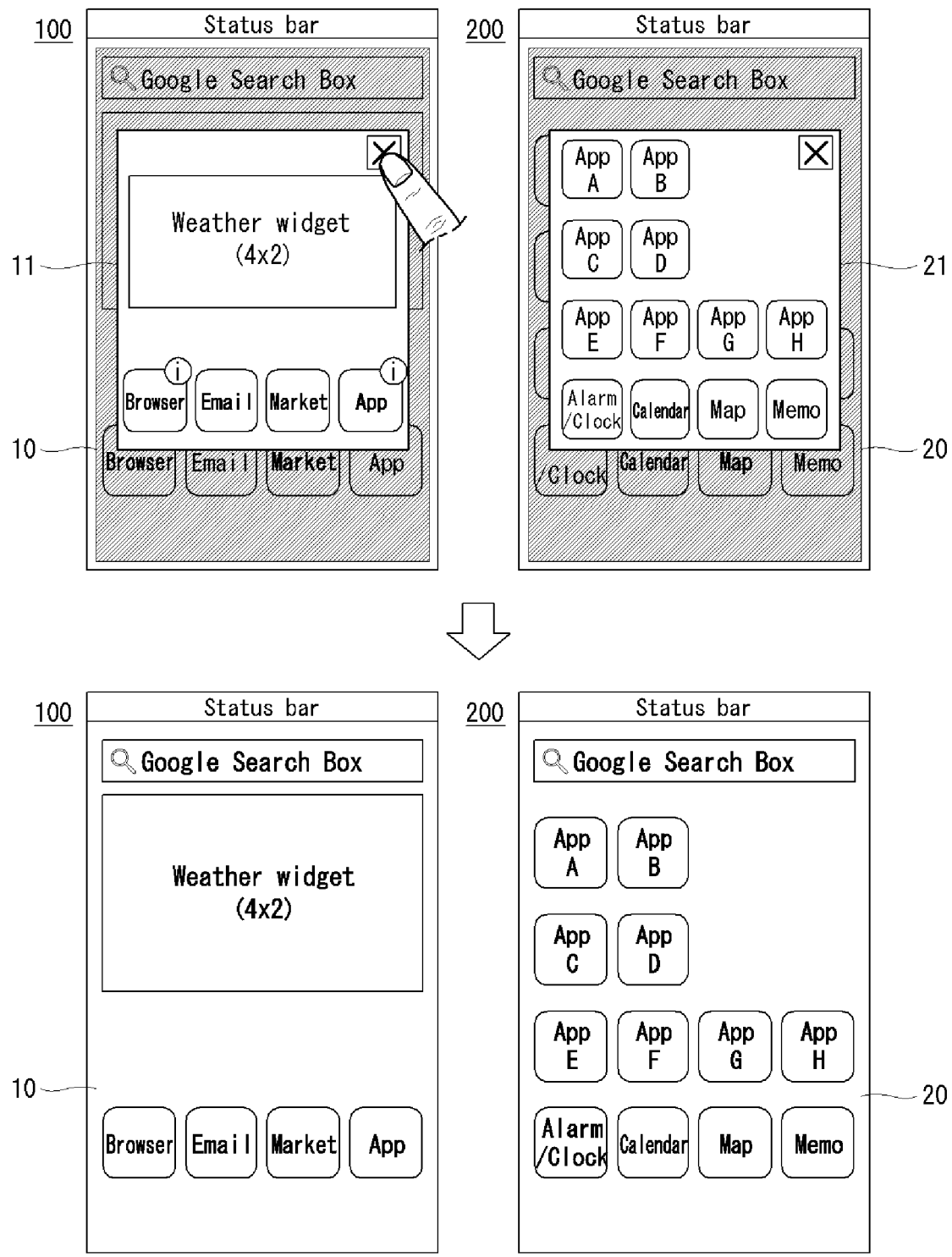
FIGS. 14 through 16 are views illustrating a case in which a mode for sharing an item is released by releasing a connection to an external device.
Figure 15:
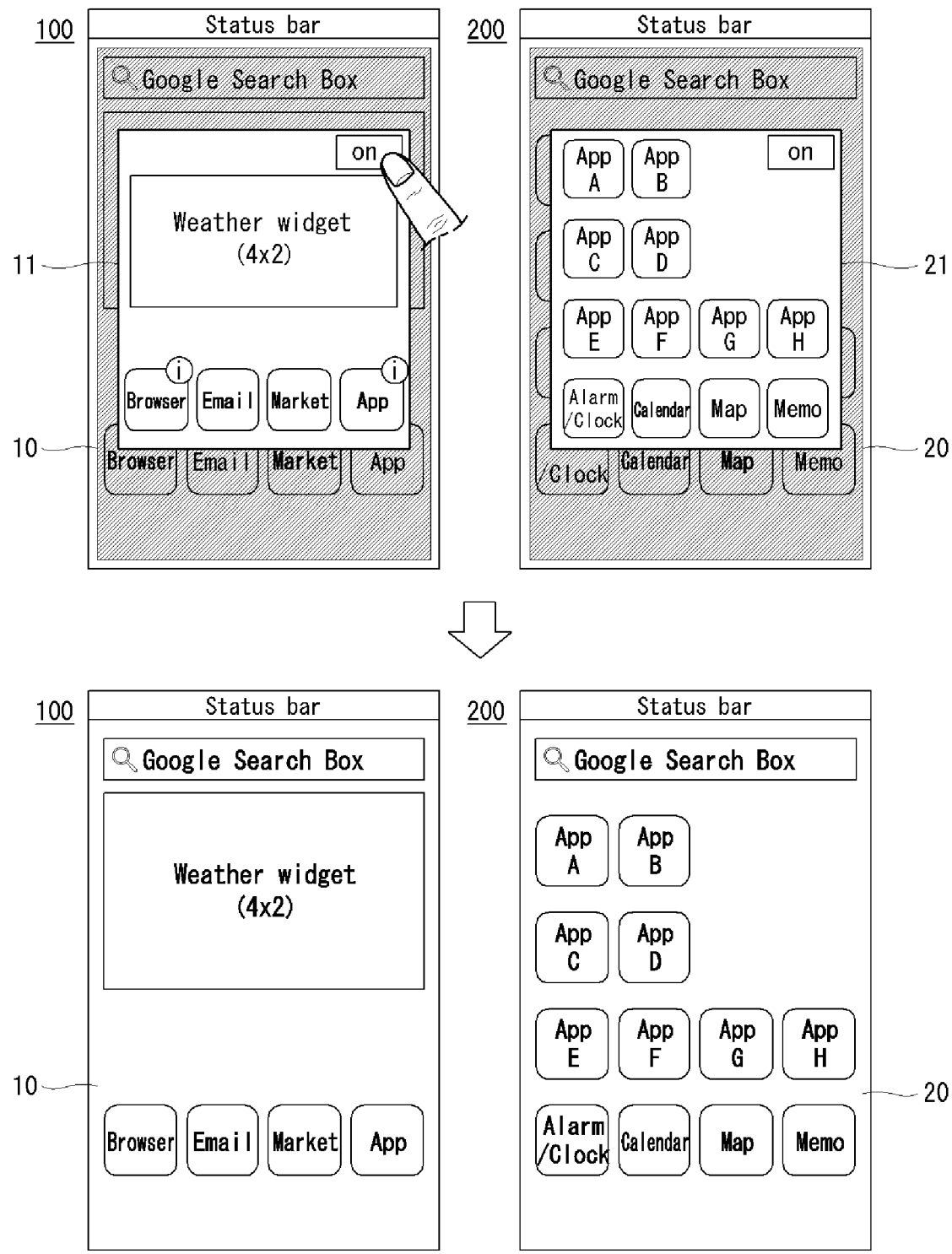
Figure 16:
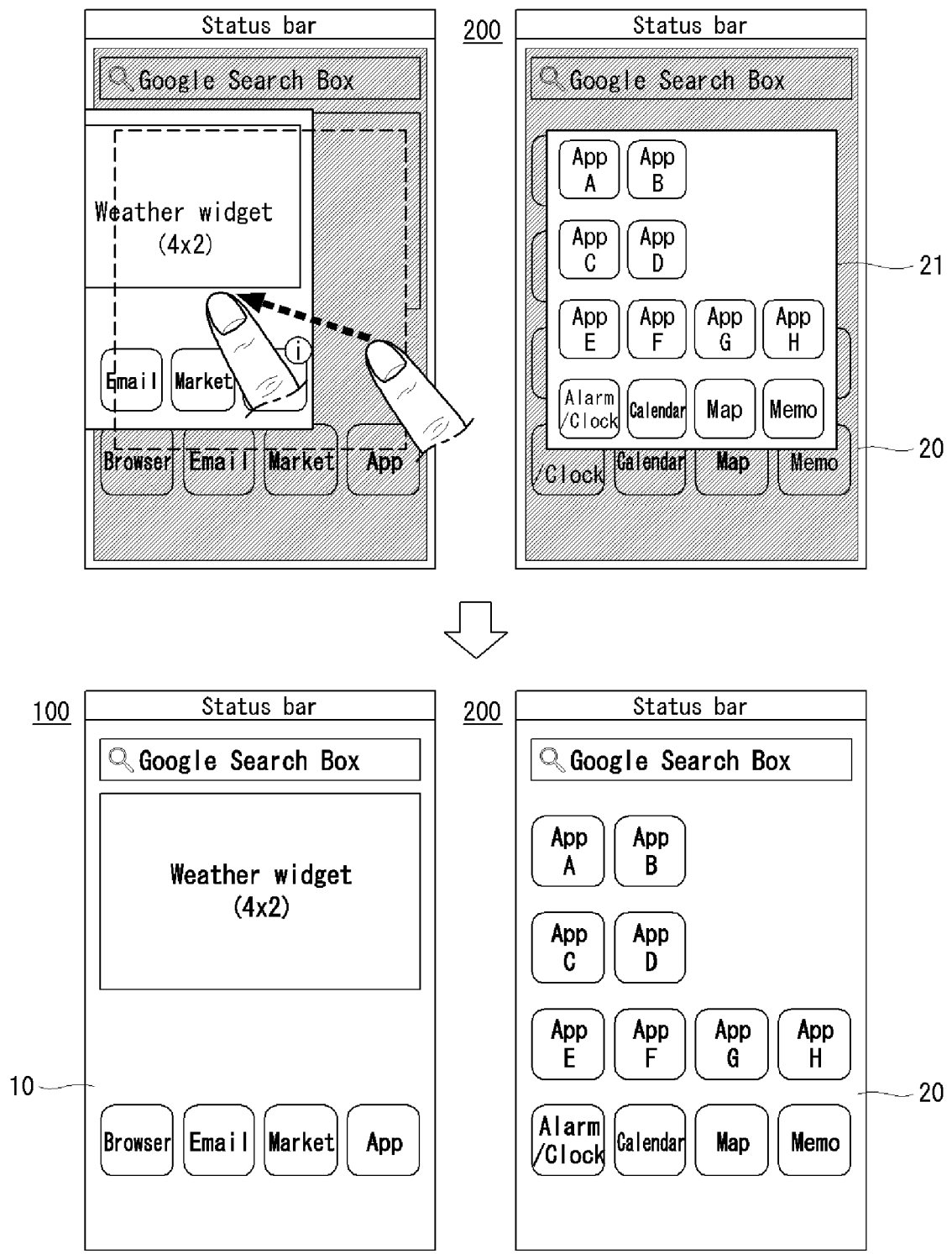

FIGS. 14 through 16 are views illustrating a case in which a mode for sharing an item is released by releasing a connection to an external device.

When a predetermined input is received in a state in which the electronic device 100 is connected to the external device 200, the controller 180 of the electronic device 100 may release the connection to the external device 200. Namely, when a predetermined input is received in the sharing mode, the controller 180 may release the connection to the external device 200 and release the sharing mode.

For example, when the electronic mode enters the sharing mode, the controller 180 may display the first layer 10 such that it overlaps with the second layer 11. Also, the controller 180 may control a connection to the electronic device 100 to display an icon for controlling entering the sharing mode in the second layer 11.

Referring to FIGS. 14 and 15, in a state in which the electronic device 100 and the external device 200 are connected, when an input of selecting an icon, e.g., "X", "On", of the second layer 11 is received, the controller 180 may release the connection to the external device 200. Accordingly, the controller 180 may delete the second layer 11 for sharing an item from the touchscreen 151 and display only the first layer 10 on the touchscreen 151.

Meanwhile, referring to FIG. 16, when an input of dragging from one end of the second layer 11 to the other end thereof is received, the controller 180 may release the connection of the electronic device 100 to the external device 200, remove the second layer 11 from the touchscreen 151, and display only the first layer 10 on the touchscreen 151.

Figure 17:
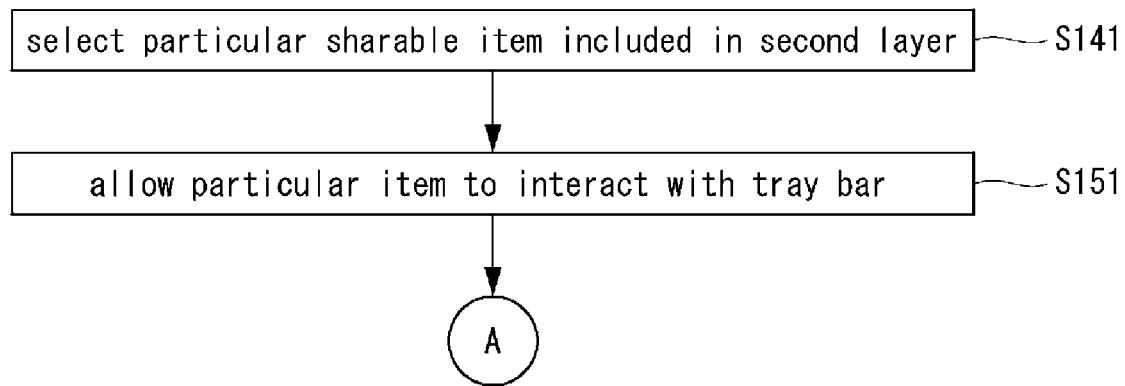
FIG. 17 is a detailed flow chart of operation S150 of FIG. 7.

FIG. 17 is a detailed flow chart of operation S150 of FIG. 7. Referring to FIG. 17, the controller 180 may share the particular item with the external device 200 through the tray bar. The controller 180 may receive an input of selecting a particular sharable item included in the second layer (S141), and may additionally receive an input of making the selected particular item interact with the tray bar (S151).

Namely, according to embodiments of the present invention, in a state in which the first layer is displayed on the touchscreen, when the electronic device 100 enters the mode for sharing an item, the second layer is displayed to overlap with the first layer and a tray bar is displayed on the touchscreen. Thereafter, a touch input of selecting a shareable item from the second layer and associating the selected item to the tray bar is received.

Hereinafter, a detailed process of sharing a particular item with an external device by using a tray bar according to an embodiment of the present invention will be described with reference to pertinent drawings.

FIG. 18A through FIG. 22 are views illustrating operations S141 and S151 of FIG. 12.

Figure 18A:
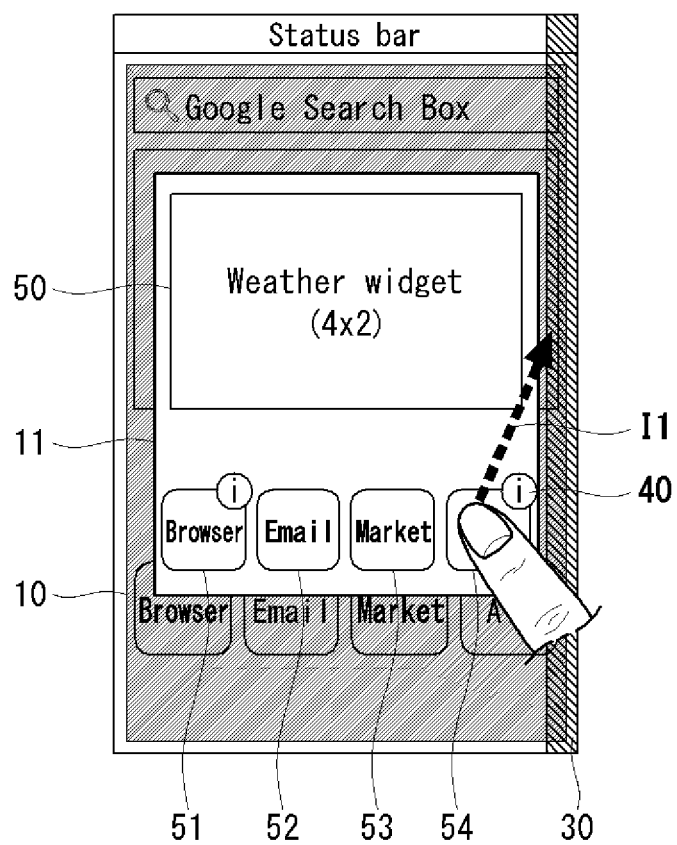
FIG. 18A through FIG. 22 are views illustrating operations S141 and S151 of FIG. 12.

Referring to FIG. 18A, when the electronic device 100 enters the mode for sharing an item in a state in which the first layer 10 is displayed on the touchscreen 151, the controller 180 of the electronic device 100 may display the second layer 11 on the first layer 10 in an overlapping manner. The second layer 11 may be displayed to be smaller than the first layer 10. Also, when the second layer 11 is displayed, the first layer 10 enters a deactivated state in which a touch input cannot be responded, and the controller 180 may distinguishably display the first layer 10 such that it is deactivated. For example, the entire region of the first layer 10 is shaded, so that the user can recognize that only a touch input with respect to the second layer 11 is valid in the mode for sharing an item.

An identification mark 40 may be displayed in at least one sharable item (51 and 54) among the plurality of items 50, 51, 52, 53, 54, and 55 included in the second layer 11. Also, when a touch input of selecting the sharable item 54 is received, a shift mark I1 indicating that the selected item 54 may be moved to the tray bar 30 may be displayed on the touchscreen 151.

Namely, when a long-touch input applied to the application 54 is received, the shift mark I1 may be provided to indicate the fact that the application 54 can be shared when moved to the tray bar 30.

Figure 18B:
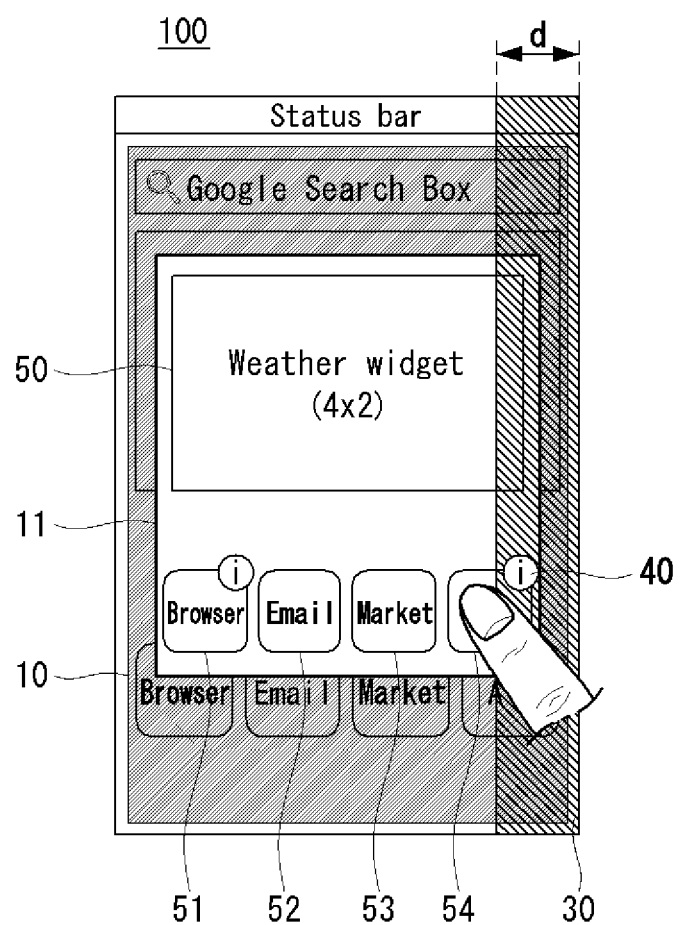

Meanwhile, referring to FIG. 18B, when a touch input applied to the sharing-target item 54 included in the second layer 11 is received, the controller 180 may increase an area of the tray bar 30. Thus, a touch input of moving the sharable item 54 to be included in the tray bar 30 having the increased area may be induced.

So far, the example of moving the sharable item to the tray bar or associating the sharable item with the tray bar has been described. However, the present invention is not limited thereto. For example, as illustrated in FIGS. 18A and 18B, in order to associate the sharable items 51 and 54 included in the second layer 11 to the tray bar 30, when a sharing-target item is selected, the tray bar 30 may be highlighted.

Figure 19:
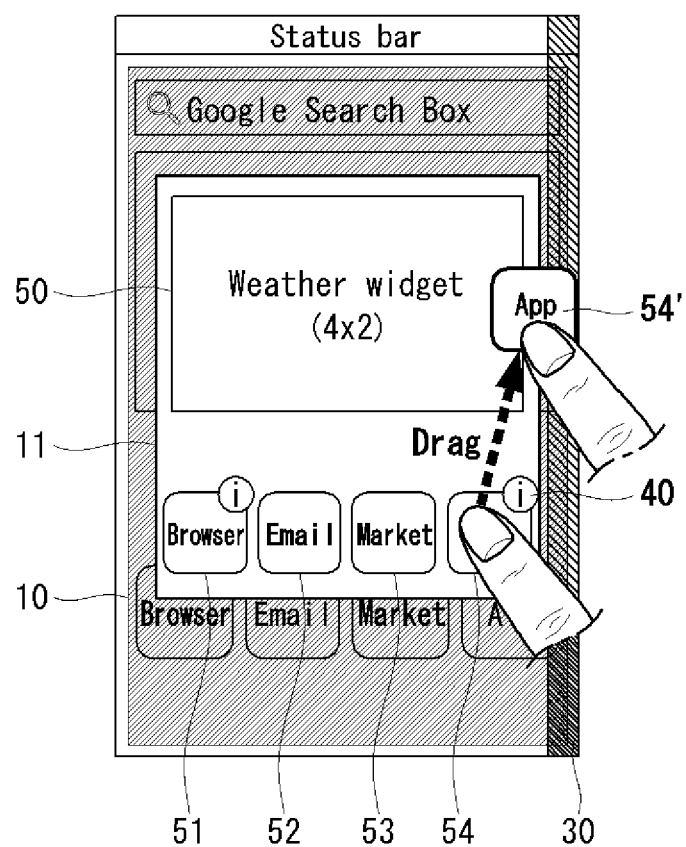

Referring to FIG. 19, when a drag input of moving the sharable item 54 to the tray bar 30 is received, the controller 180 may display a sharable item 54' associated with the tray bar 30 on the touchscreen 151.

The item 54' associated with the tray bar 30 may be displayed to be within the tray bar 30. For example, the item 54' may be controlled to be reduced in size so as to be displayed within the tray bar 30. Also, by displaying the item 54' such that it overlaps with at least a portion of the tray bar 30, the item 54' may be displayed to be attached to the tray bar 30.

Figure 20:
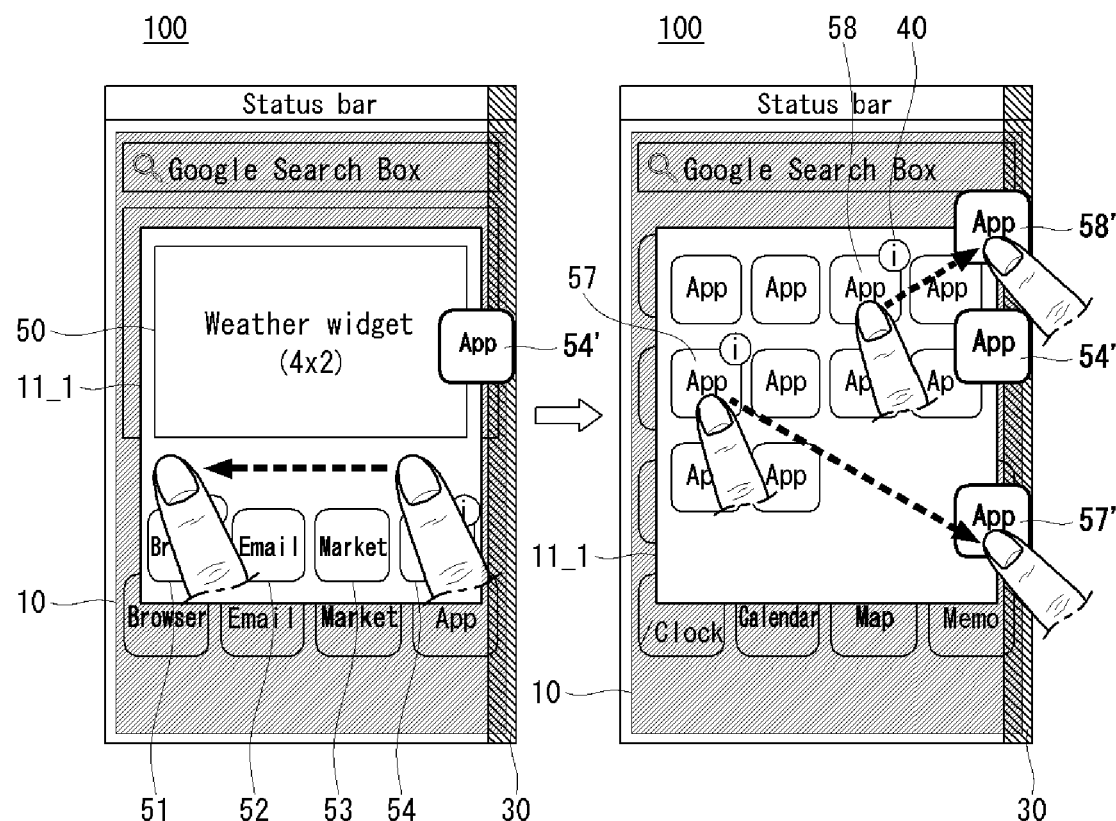

FIG. 20 is a view illustrating an example of associating a plurality of items with a tray bar.

Referring to FIG. 20, the first layer 11 may be made up of a plurality of pages. For example, the first layer 11 may include a first page 11_1, a second page 11_2, . . . , an Nth page 11_N, and at least one item may be displayed in each page. In response to a scroll input of the user, the first to Nth pages may be scrolled to be displayed on the touchscreen 151.

In a state in which the sharable item 54' included in the first page 11_1 is associated with the tray bar 30, when a user's scroll input or flicking put is received, the controller 180 may display the second page 11_2, instead of the first page 11_1, on the touchscreen, such that they overlap with the first layer 10.

The controller 180 may receive a drag input of moving the sharable items 57 and 58 included in the second page 11_2 of the first layer 11 to the tray bar 30.

Namely, according to an embodiment of the present invention, the second layer 11 may include a plurality of pages 11_1 and 11_2, and by associating the sharable items 57 and 58 included in each of the plurality of pages 11_1 and 11_2 with the tray bar 30, the plurality of items 54, 57, and 58 may be shared with the external device.

Accordingly, the user may select a desired page among the plurality of pages constituting the second layer 11 through a scroll input, a flicking input, or the like, thus selecting the page in which an item desired to be shared is to be disposed.

Meanwhile, the user's scroll input or flicking input are merely illustrative and the present invention is not limited thereto. For example, when a pinch zoom-in input is received in the first page constituting the second layer 11, the controller 180 may display thumbnail images (not shown) of all the pages constituting the second layer 11 on the touchscreen 151, display a page corresponding to a selected one of the plurality of thumbnail images in the second layer, and dispose an item desired to be shared in the corresponding page.

Figure 21:
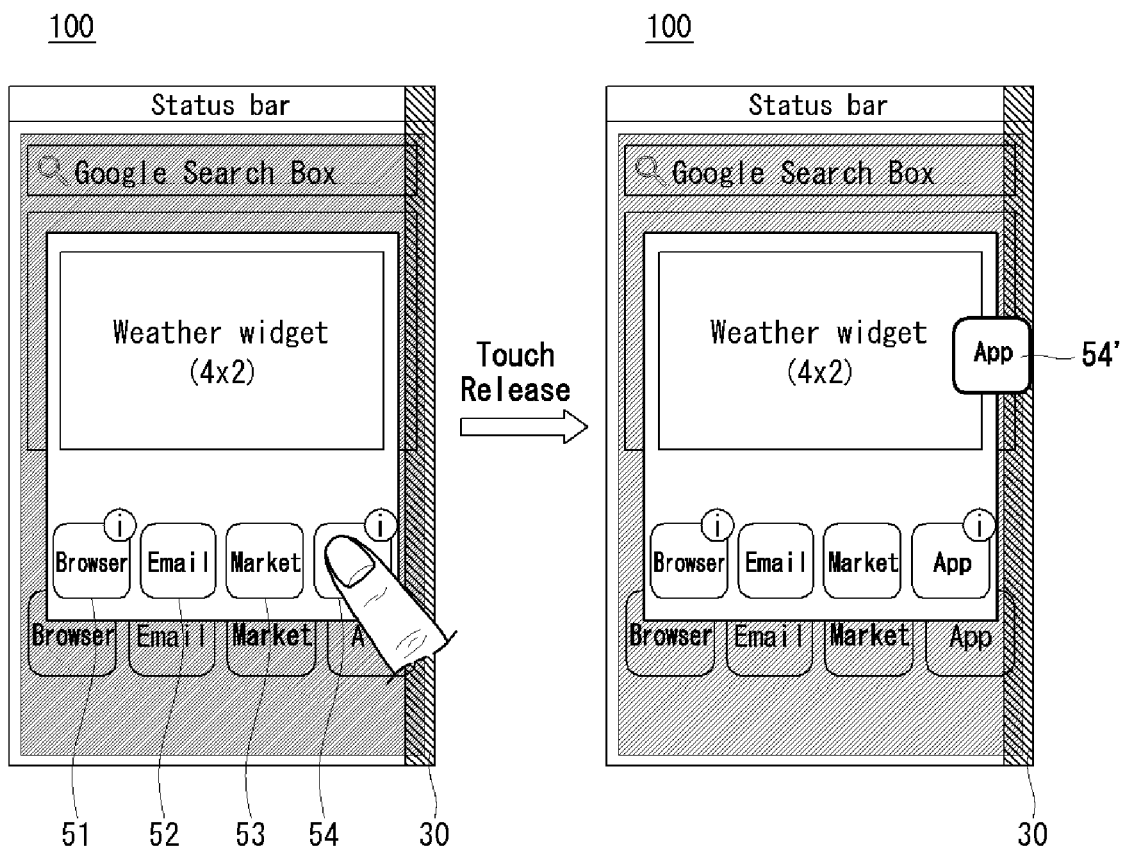
Figure 22:
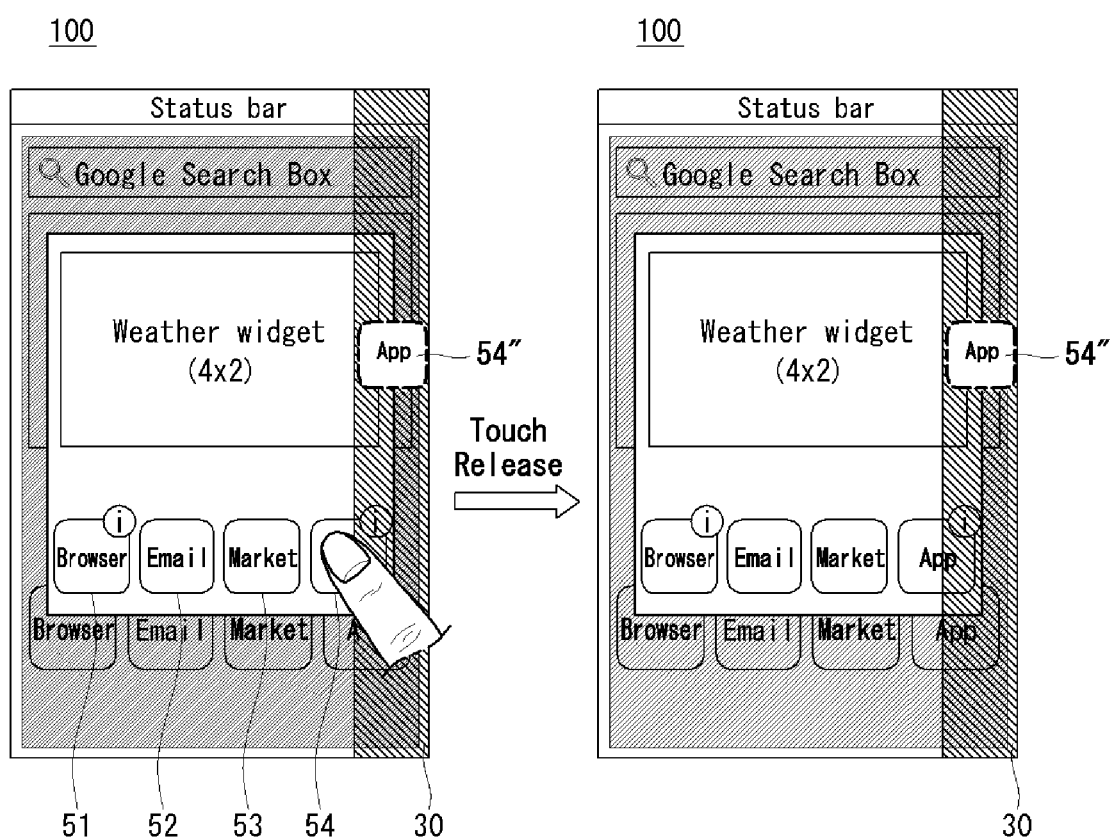

FIGS. 21 and 22 are views illustrating other examples of associating a particular item with a tray bar.

Referring to FIG. 21, when a long-touch input applied to the sharing-target item 54 is received and the long-touch input is released, the item 54 to which the long-touch input was applied automatically moves to the tray bar 30. Here, reference numeral 54' denotes an item associated with the tray bar 30.

Meanwhile, referring to FIG. 22, when a long-touch input applied to the sharing-target item 54 is received, the controller 180 may display a virtual item 54" corresponding to the sharing-target item 54 such that it is included in the tray bar 30. The controller 180 may display the virtual item 54" in the tray bar 30 by reducing a size thereof. Thereafter, when the long-touch input is released, the virtual item 54" may be changed into the actual item 54' and displayed in the tray bar 30.

In the above embodiments, the process of using a tray bar displayed in the electronic device 100 in order to share an item displayed in the electronic device 100 with the external device 200 has been described.

Hereinafter, a process of arranging a sharing-target item associated with the tray bar in a particular region or in a particular position of the external device 200 will be described in detail with reference to pertinent drawings.

Figure 23:
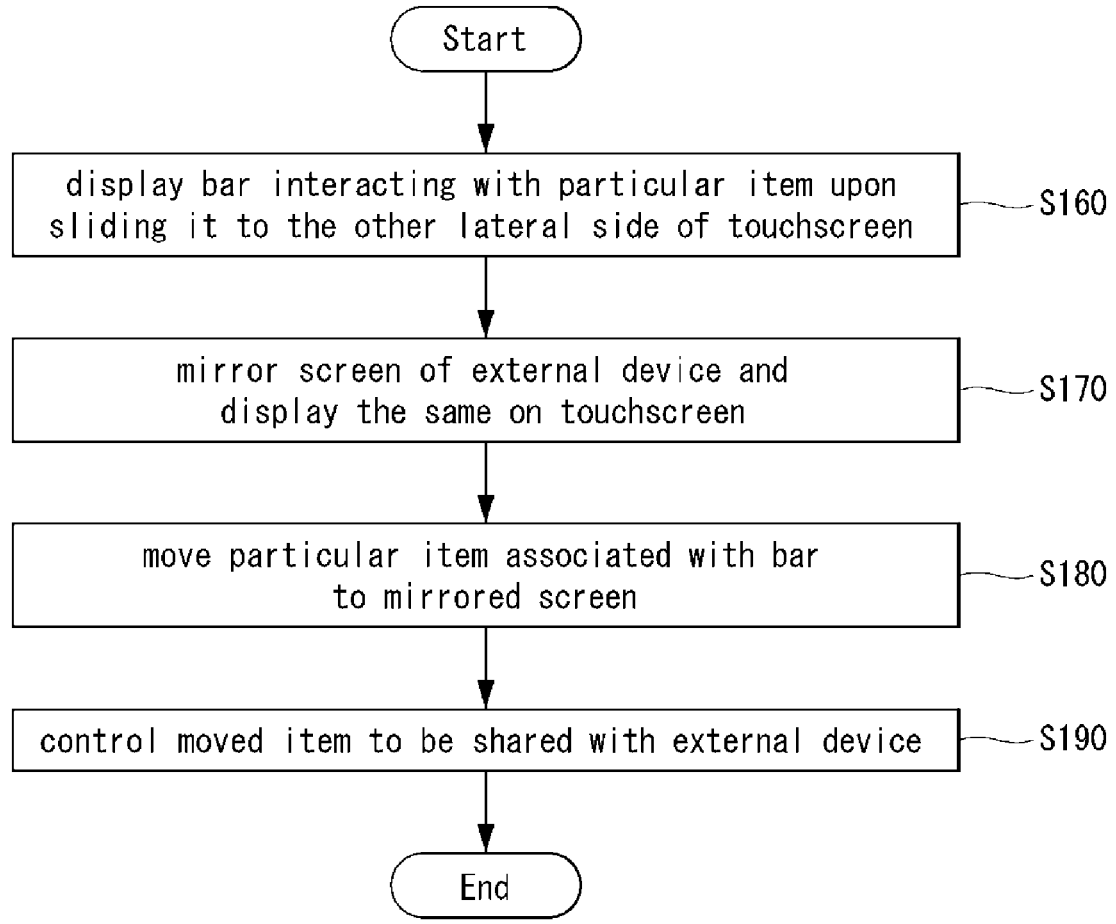
FIG. 23 is a flow chart illustrating a control method of an electronic device according to a third embodiment of the present invention.

FIG. 23 is a flow chart illustrating a control method of an electronic device according to a third embodiment of the present invention. FIGS. 24 through 28 are views illustrating the control method of an electronic device according to the third embodiment of the present invention. The control method of an electronic device according to the third embodiment of the present invention may be implemented in the electronic device 100 described above with reference to FIG. 1. Hereinafter, the control method of an electronic device according to the third embodiment of the present invention and an operation of the electronic device for implementing the method will be described in detail.

The third embodiment of the present invention may be implemented on the basis of various embodiments (first and second embodiments) in which an item displayed in a second layer is associated with a tray bar.

Also, the third embodiment of the present invention may be implemented in a state in which the electronic device 100 and the external device 200 are connected through a short-range communication link.

Referring to FIG. 23, the controller 180 of the electronic device 100 may display a bar interacting with a particular item upon sliding it to the outer lateral side of the touchscreen 151 (S160).

Figure 24:
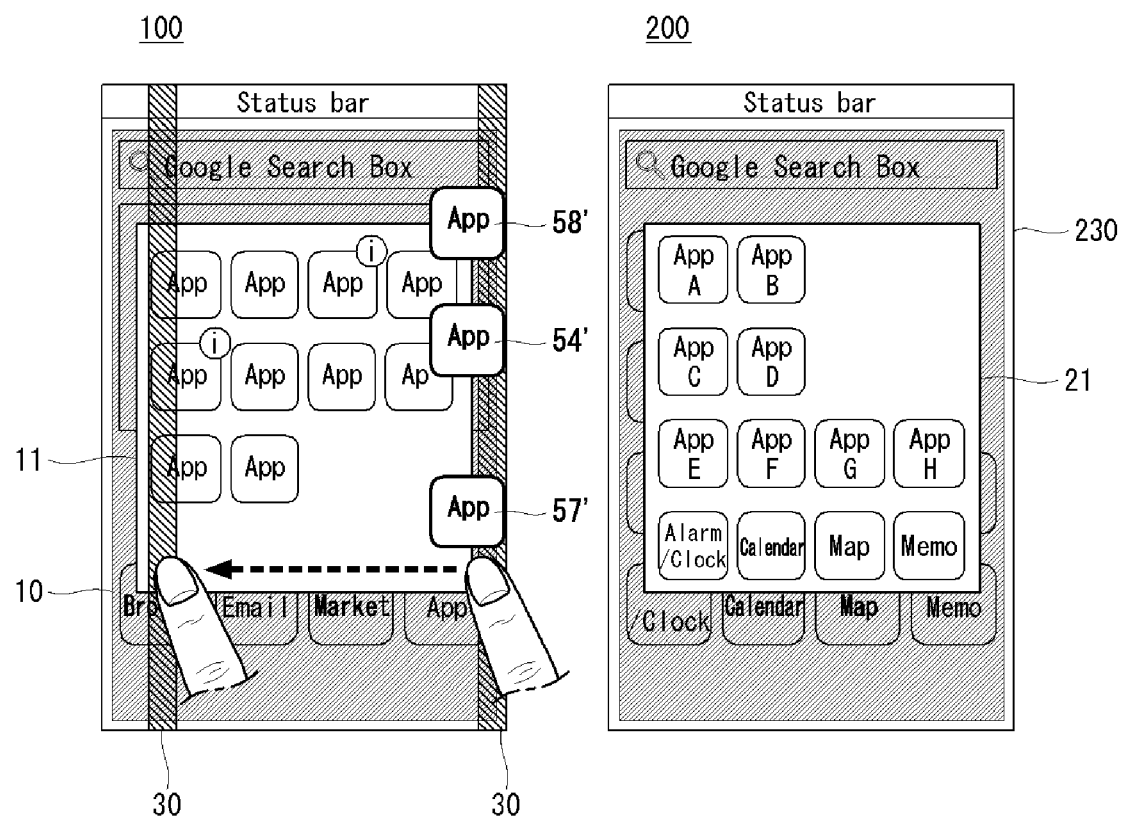
FIGS. 24 through 28 are views illustrating the control method of an electronic device according to the third embodiment of the present invention.

Referring to FIG. 24, sharable items 54', 55', and 56' are associated with the tray bar 30. The controller 180 may display the tray bar 30 in one lateral side of the touchscreen 151. A drag input of moving the tray bar 30 displayed in one lateral side of the touchscreen 151 to the other lateral side may be received.

Meanwhile, the external device 200 connected to the electronic device 100 may also display the second layer 21 on the display unit 230 in the item sharing mode. The second layer 21 may include a plurality of items (App A, App B, App C, App D, App E, App F, App G, App H, Alarm/Clock, Calendar, Map, Memo).

Referring back to FIG. 18, the controller 180 may mirror a screen of the external device 200 and display the same on the touchscreen 151 (S170).

Figure 25:
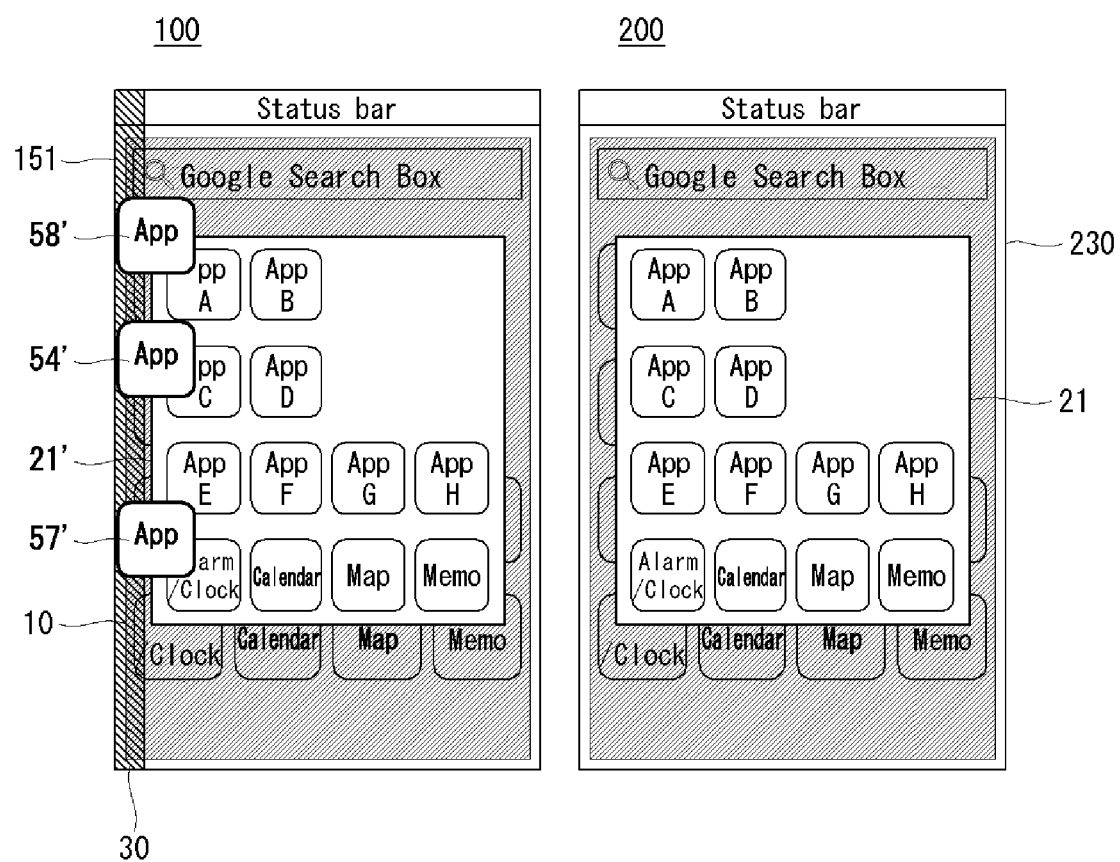

Referring to FIG. 25, since the tray bar 30 slides from the right side to the left side and displayed, the controller 180 may display a screen 21' obtained by mirroring the screen (i.e., the second layer 21) displayed in the external device 200, on the touchscreen 151 of the electronic device 100.

Referring back to FIG. 23, the controller 180 may receive an input of moving a particular item associated with the tray bar to the mirrored screen (S180).

Figure 26:
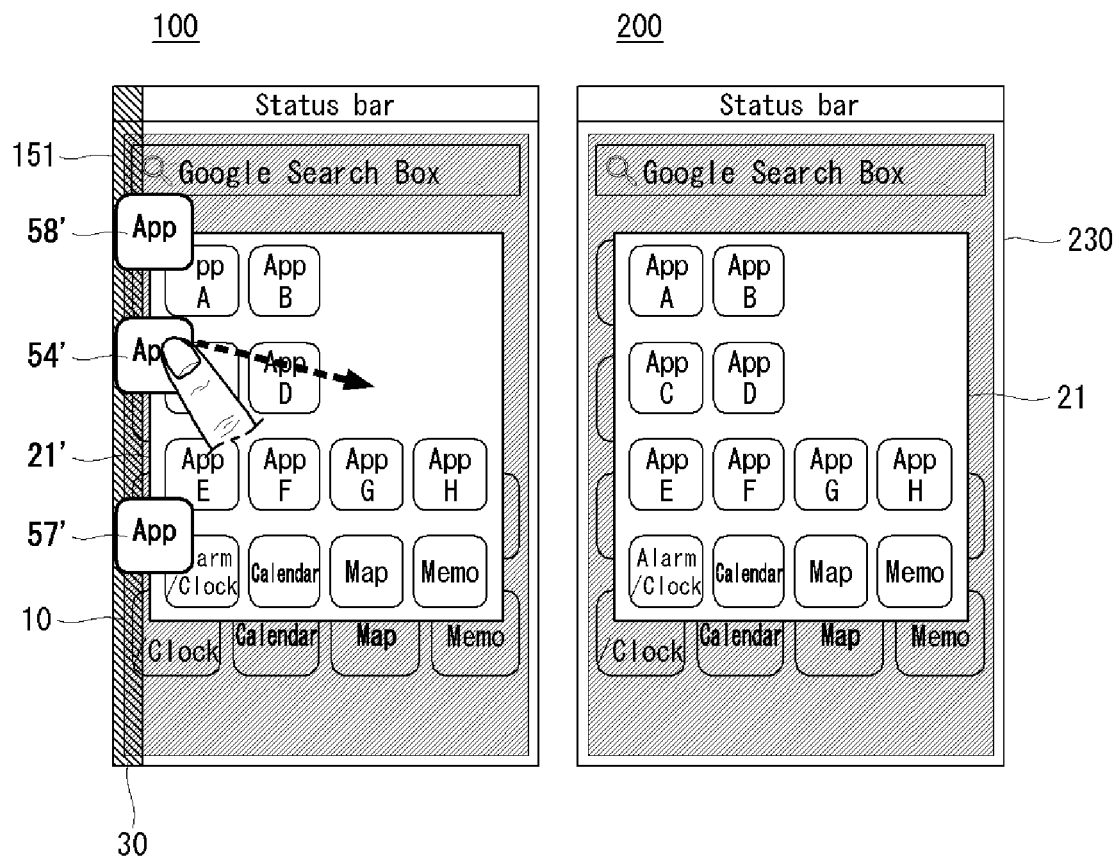
Figure 27:
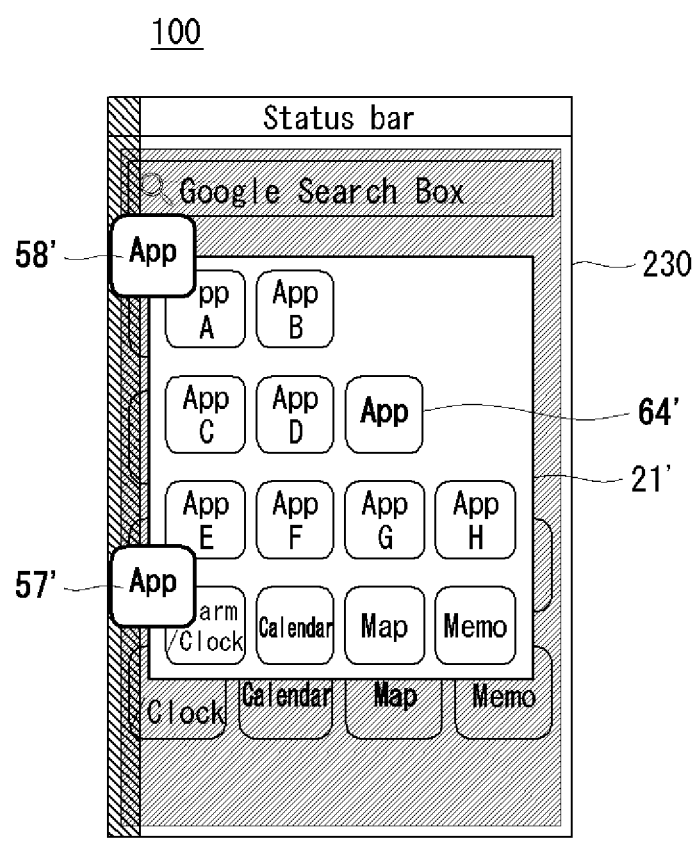

Referring to FIGS. 26 and 27, a drag input of moving the particular item 54' associated with the tray bar 30 to a particular portion of the mirrored screen 21' may be received. Here, the mirrored screen 21' may have the same configuration and arrangement as those of the screen 21 of the second layer displayed on the display unit 230 of the external device 200.

Referring back to FIG. 23, the controller 180 may control the moved item such that it is shared with the external device (S190).

Figure 28:
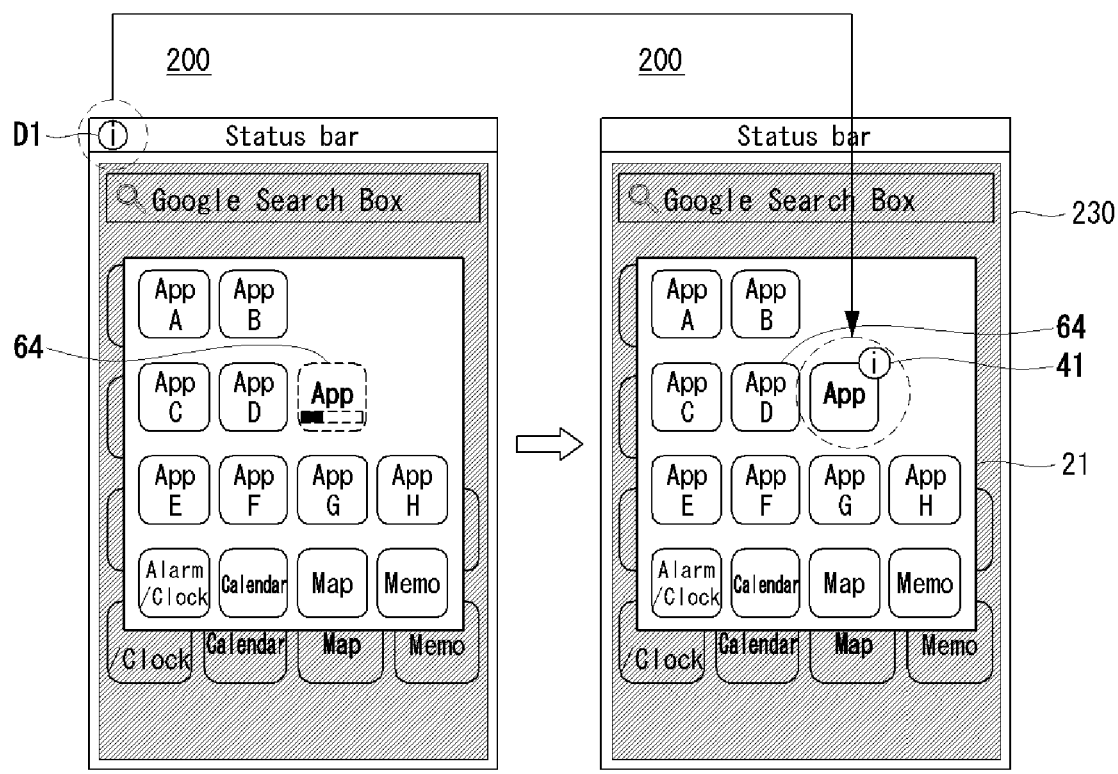

Referring to FIG. 28, the controller 180 of the electronic device 100 may transmit a control signal for downloading an application 64 corresponding to a sharing-target item (64' in FIG. 27) from an external server, to the external device 200.

Upon receiving the control signal, the external device 200 may download the application 64 and store the downloaded application 64. The external device 200 may provide an identification mark 41 indicating that the application 64 has been shared with the electronic device 100 and downloaded.

Figure 29:
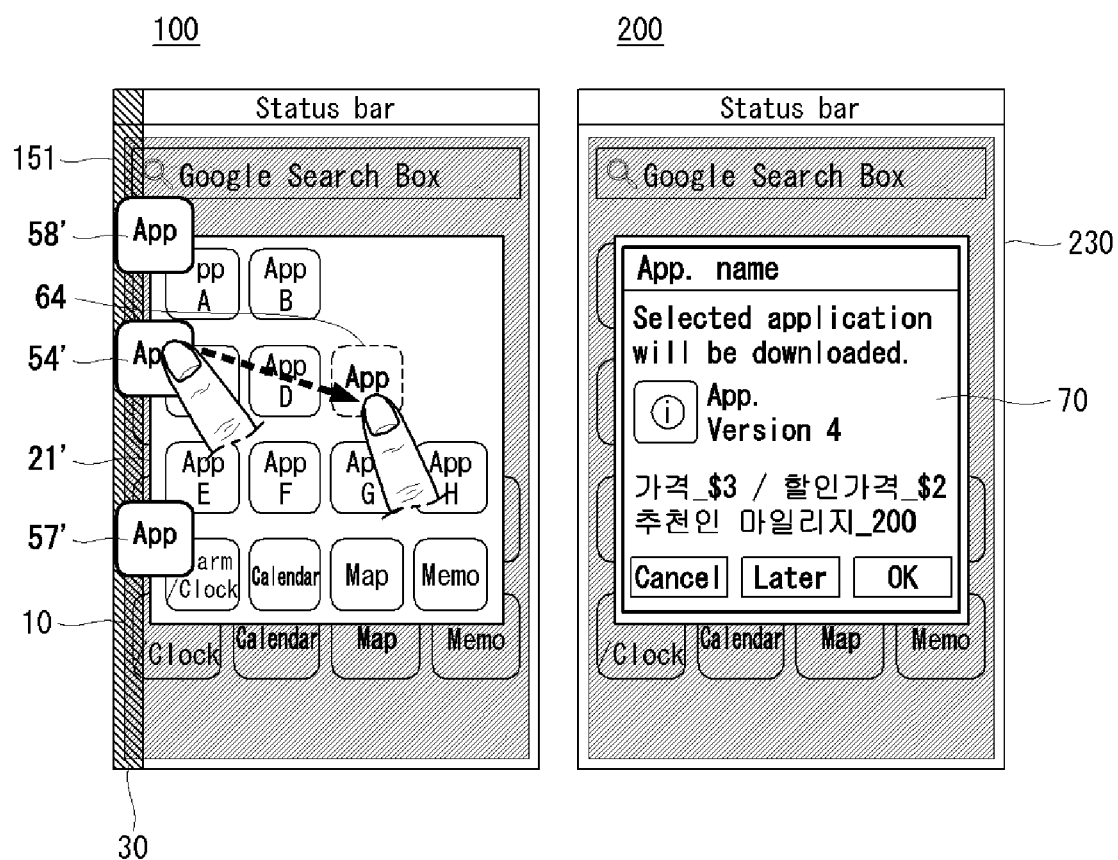
FIG. 29 is a view illustrating an example of a process of sharing an item when an item to be shared is a paid item.

Meanwhile, referring to FIG. 29, an item desired to be shared by the electronic device 100 with the external device 200 may include an item that can be downloaded from an external server free of charge and an item that can be downloaded upon payment. In a case in which the item is provide upon payment, a pop-up window 70 as to whether the external device 200 is to download the corresponding item may be controlled to be displayed on the display unit 230.

Meanwhile, in the case in which a particular item is intended to be shared with the external device according to an embodiment of the present invention, the sharing operation may be performed in association with a certain service. For example, in the case in which the item to be shared is a paid item, when the external device 200 downloads the item as a sharing target, the downloaded item may be used free of charge during a predetermined period. Also, an indicator indicating a period during which the item is used free of charge may be displayed together with the downloaded item.

Meanwhile, when the external terminal (i.e., the external device 200) downloads the item as a sharing target, a discount is applied. The person (i.e., the electronic device 100) who shares the item may be provided with a service allowing for accumulation of a predetermined points (mileage).

Figure 30:
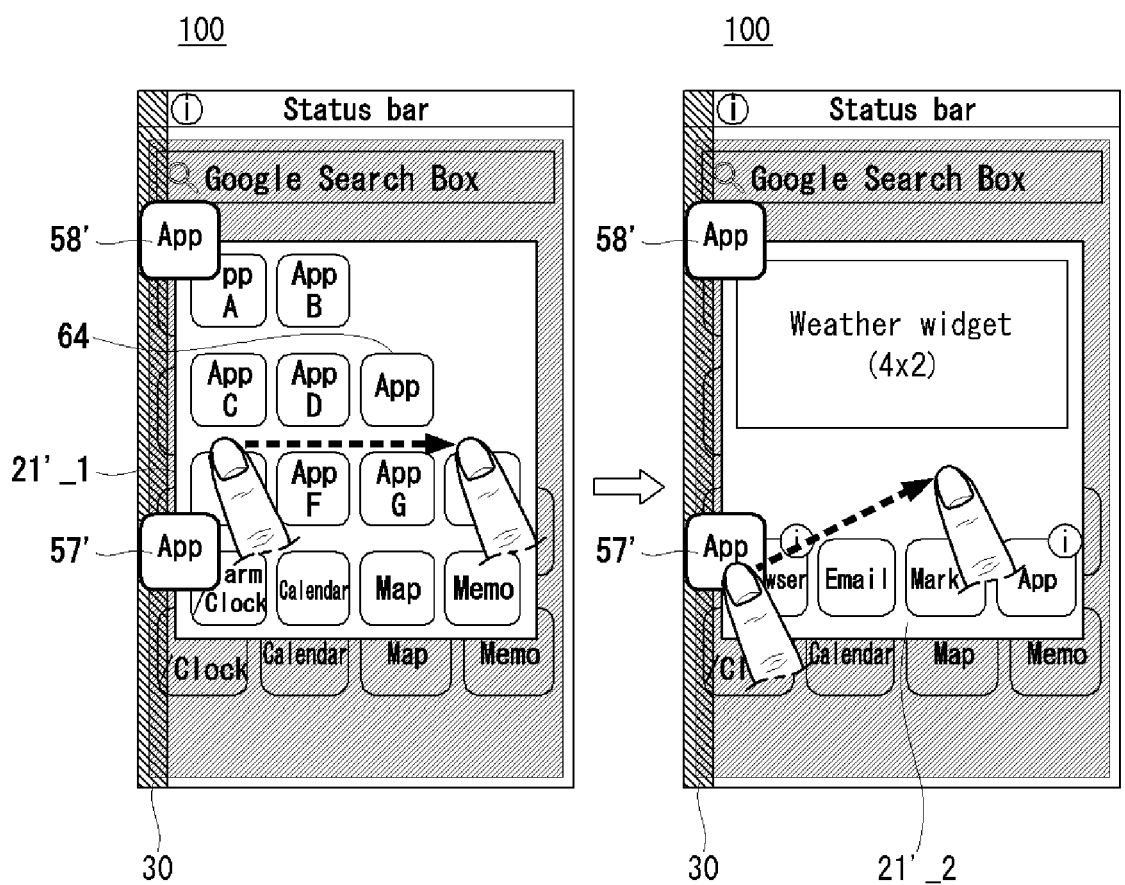
FIGS. 30 and 31 are views illustrating a control method of an electronic device to share a plurality of items according to the third embodiment of the present invention.
Figure 31:
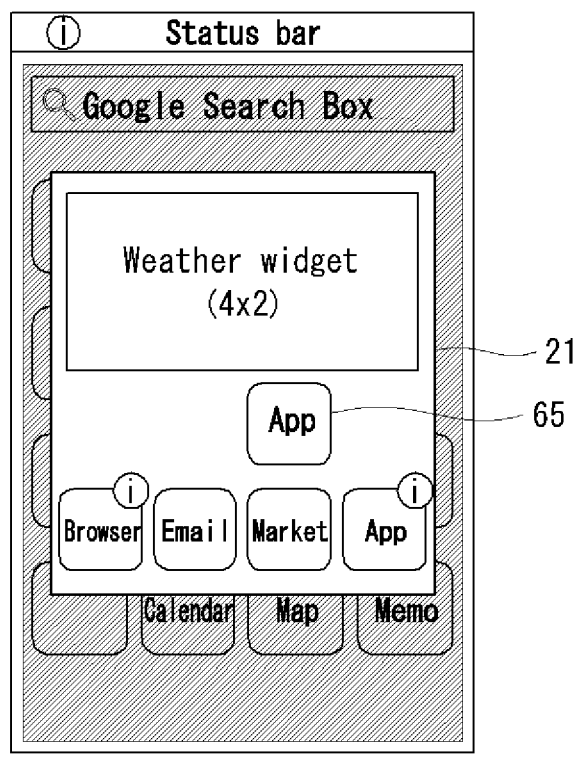

FIGS. 30 and 31 are views illustrating examples of processes of sharing an item when an item as a sharing target is a paid item.

Referring to FIGS. 30 and 31, the electronic device 100 may display the mirrored screen 21' of the external device 200 on the touchscreen 151. As described above, the mirrored screen 21' of the external device 200 may include a plurality of pages. The plurality of pages may include a plurality of items, respectively. When a scroll input or flicking input applied to the first page 21'_1 of the mirrored screen 21 is received, the controller 180 may display a second page 21'_2 on the touchscreen 151. Thereafter, a drag input of moving a different item 57' associated with the tray bar 20 to the second page 21'_2 may be received.

Thus, as illustrated in FIG. 31, the controller 180 may transmit a control signal for sharing the application 65 corresponding to the item 57' with the external device 200 to the external device 200.

The control signal may be transmitted to the external device 200 or to a server (not shown). When the control signal is transmitted to the external device 200, the control signal includes a command enabling the external device 200 to request downloading of the shared application 65 from the server. Also, when the control signal is transmitted to the server (not shown), the control signal may include a signal for controlling the server (not shown) to transmit the application 65 to the external device 20.

Figure 32:
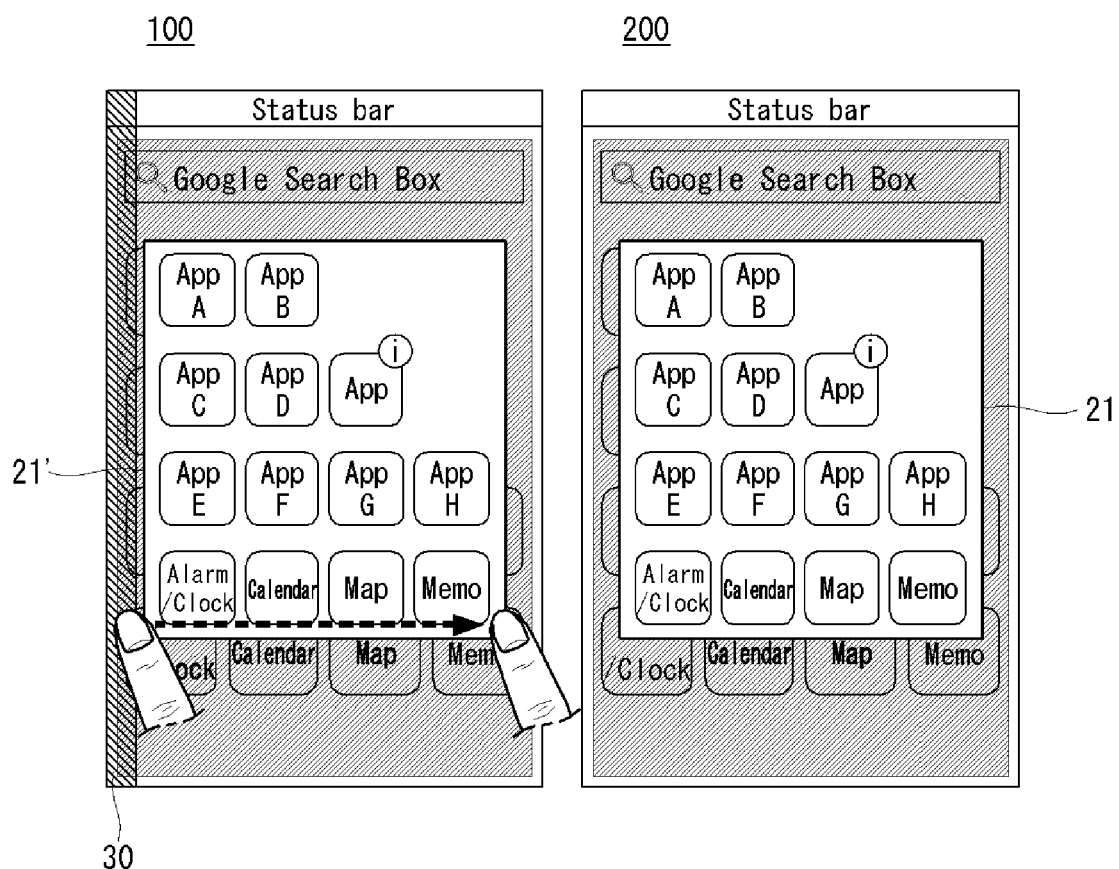
FIGS. 32 and 33 are views illustrating an example of releasing a connection between an electronic device and an external electronic device according to an embodiment of the present invention.
Figure 33:
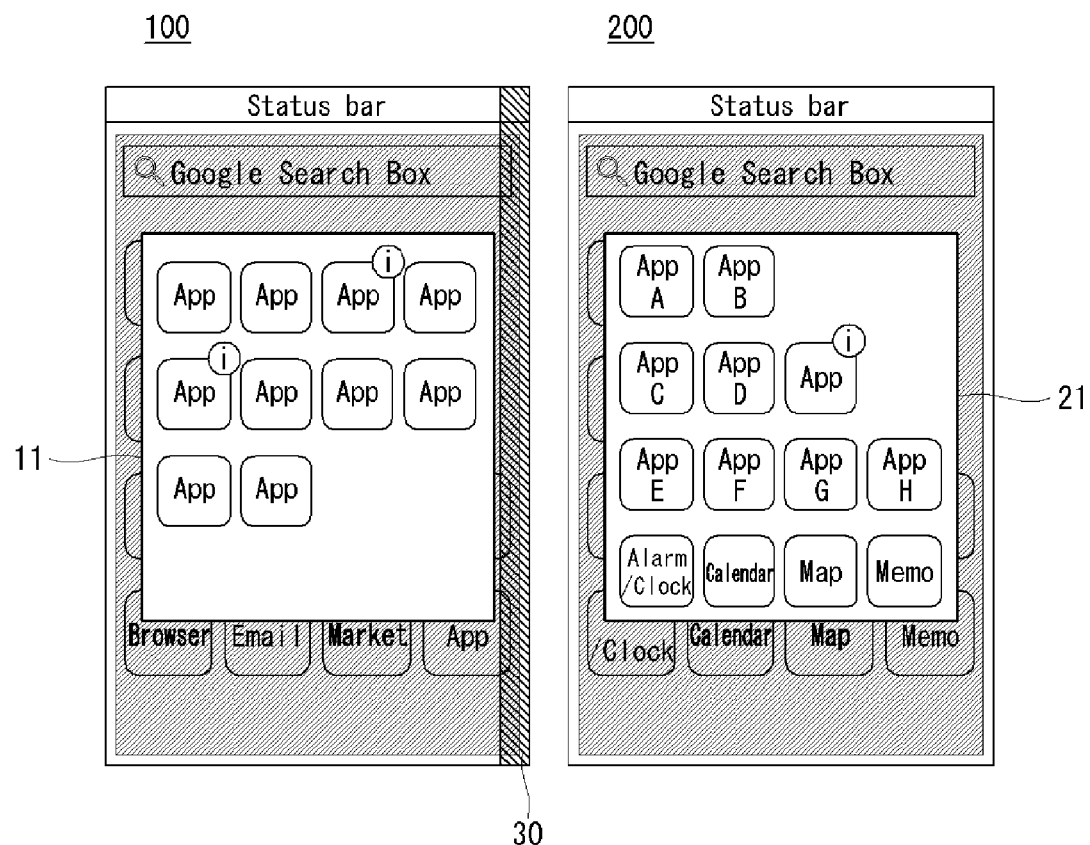

FIGS. 32 and 33 are views illustrating an example of releasing a mirroring relationship between an electronic device and an external electronic device according to an embodiment of the present invention.

Referring to FIG. 32, as described above, when the tray bar 30 is moved from one lateral side of the touchscreen 151 to the other lateral side, the screen 21 of the external device 200 is mirrored and the mirrored screen 21' is displayed on the touchscreen 151.

Namely, the electronic device 100 may display the screen displayed in the external device 200, on the touchscreen 151. Also, when the screen displayed in the external device 200 is changed, the mirrored screen 21' may also be changed to be displayed.

As illustrated in FIG. 32, when a drag input of moving the tray bar 30 displayed in the left boundary region of the touchscreen 151 to the right boundary region is received, the controller 180 may release a mirroring relationship between the electronic device 100 and the external device 200 as illustrated in FIG. 33.

When the electronic device 100 and the external device 200 are in the mirroring relationship, it means that any one of the screens of the two devices is mirrored to the other one and displayed as it is on the display of the other device.

Thus, since mirroring relationship between the electronic device 100 and the external device 200 is released, the screen 11 displayed on the touchscreen 151 and the screen 21 displayed on the display of the external device 200 are changed.

Figure 34:
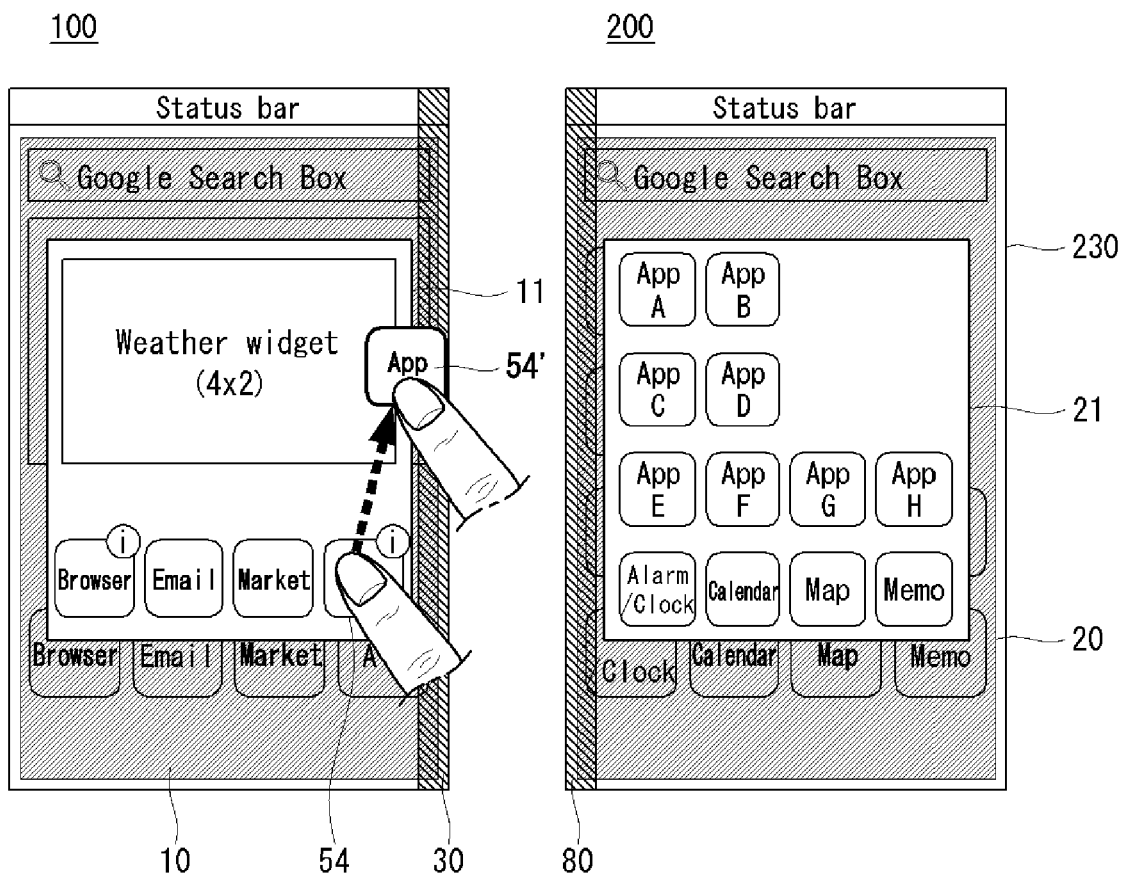
FIGS. 34 and 35 are views illustrating an example of sharing a particular item with an external device according to a fourth embodiment of the present invention.
Figure 35:
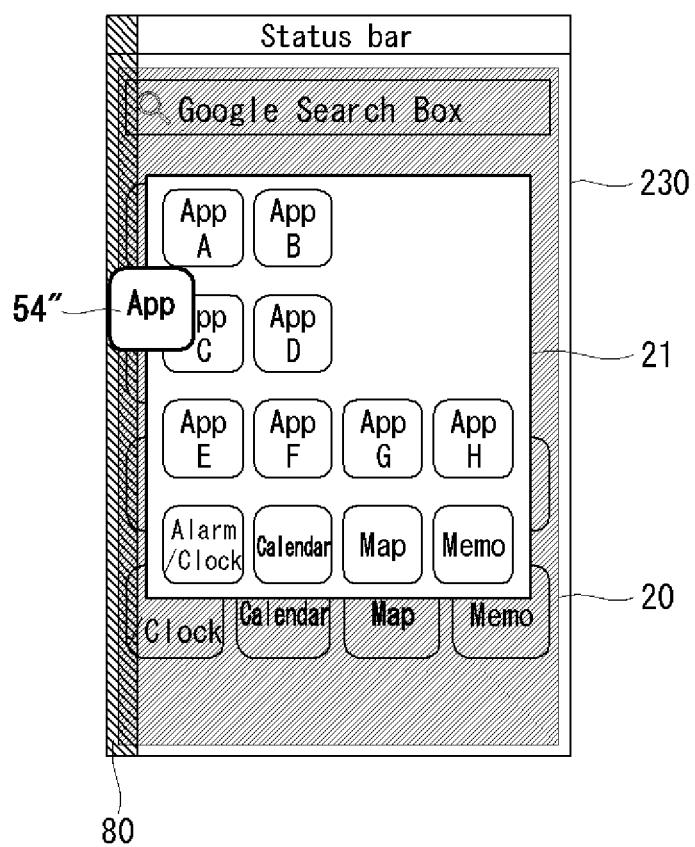

FIGS. 34 and 35 are views illustrating an example of sharing a particular item with an external device according to a fourth embodiment of the present invention. The control method of an electronic device according to the fourth embodiment of the present invention may be implemented in the electronic device 100 described above with reference to FIG. 1. Hereinafter, the control method of an electronic device according to the third embodiment of the present invention and an operation of the electronic device for implementing the method will be described in detail.

So far, the process of mirroring the screen of the external device 200 on the touchscreen 151 of the electronic device 100 and disposing shared items through the mirrored screen has been described. However, in the present embodiment, although the display unit of the external device 200 is not mirrored on the touchscreen 151 of the electronic device 100, the external device 200 may directly control arrangement of the shared items.

Referring to FIG. 34, the controller 180 of the electronic device 100 may display the second layer 11 such that it overlaps with the first layer 10 in the mode for sharing an item. Also, in the mode for sharing an item, the external device 200 may also display the second layer 21 such that it overlaps with the first layer 20.

In the mode for sharing an item, when a touch input of moving the item 54 to be shared, among the items displayed in the second layer 11, to the tray bar 30 is received, the controller 180 may transmit a control signal for displaying a bar 80 corresponding to the tray bar 30 on the display unit 230 of the external device 200, to the external device 200.

Meanwhile, in response to the control signal received from the electronic device 100, the external device 200 may display the item 54" shared with the electronic device 100 in the bar 80 displayed on the display unit 230 in an associated manner.

Thereafter, an input of arranging the item 54" in a particular position of the second layer 21 may be received according to a user input.

According to an embodiment of the present invention, the case in which an item included in the electronic device 100 is shared with the external device 200 has been described, but the present invention is not limited thereto. For example, referring to FIG. 29, both the electronic device 100 and the external device 200 may display the tray bar. It is assumed that the first tray bar is provided to the electronic device 100 and the second tray bar 80 is provided to the external device 200.

Namely, the electronic device 100 and the external device 200 forming a communication link for short-range communication may share items through the first tray bar 30 and the second tray bar 80. The operation of sharing items stored in the external device 200 with the electronic device 100 through the second tray bar 80 is the same as that of the foregoing embodiments in which the items of the electronic device 100 are shared with the external device 200.

However, in an embodiment of the present invention, while the electronic device 100 is sharing a first item (an item stored in the electronic device 100) with the external device 200 by using the first tray bar 30, the external device 200 may share a second item (an item stored in the external device 200) with the electronic device 100 by using the second tray bar 80.

Figure 36:
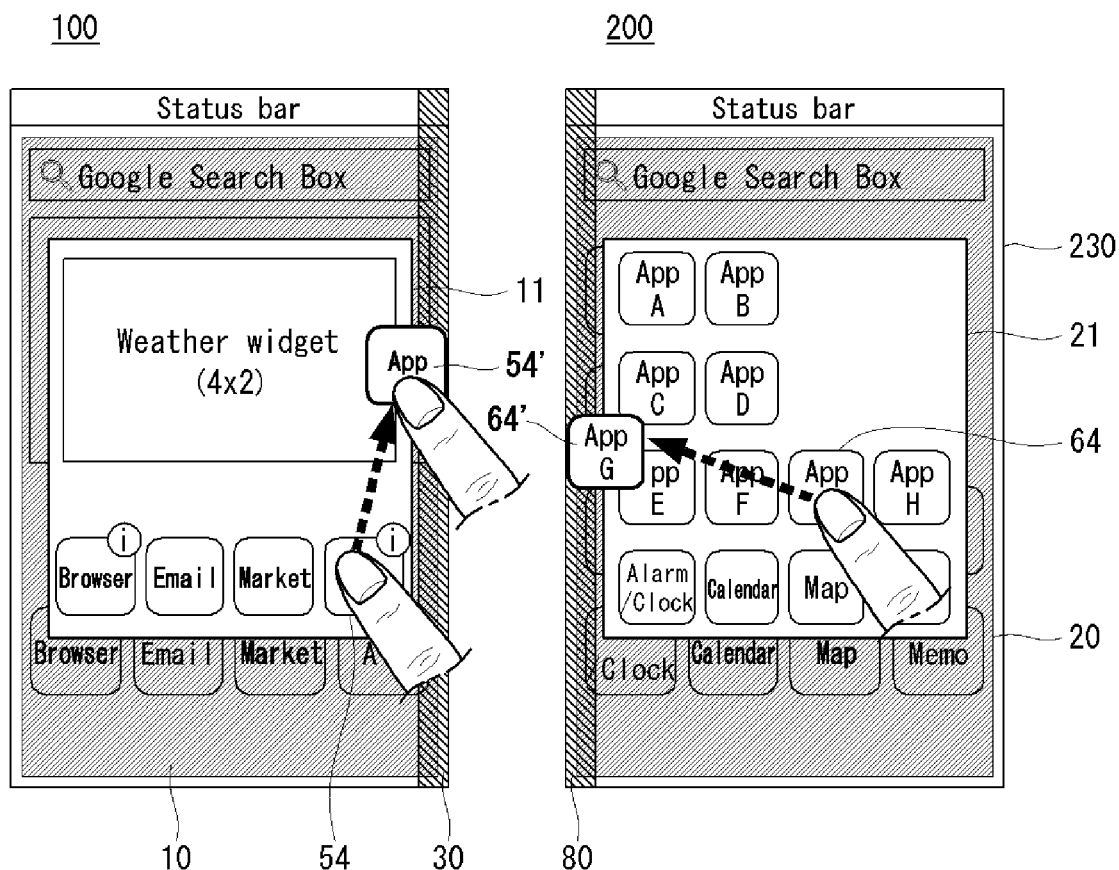
FIGS. 36 and 37 are views illustrating an embodiment in which even an external device can share an item with an electronic device according to a modification of the present invention.
Figure 37:
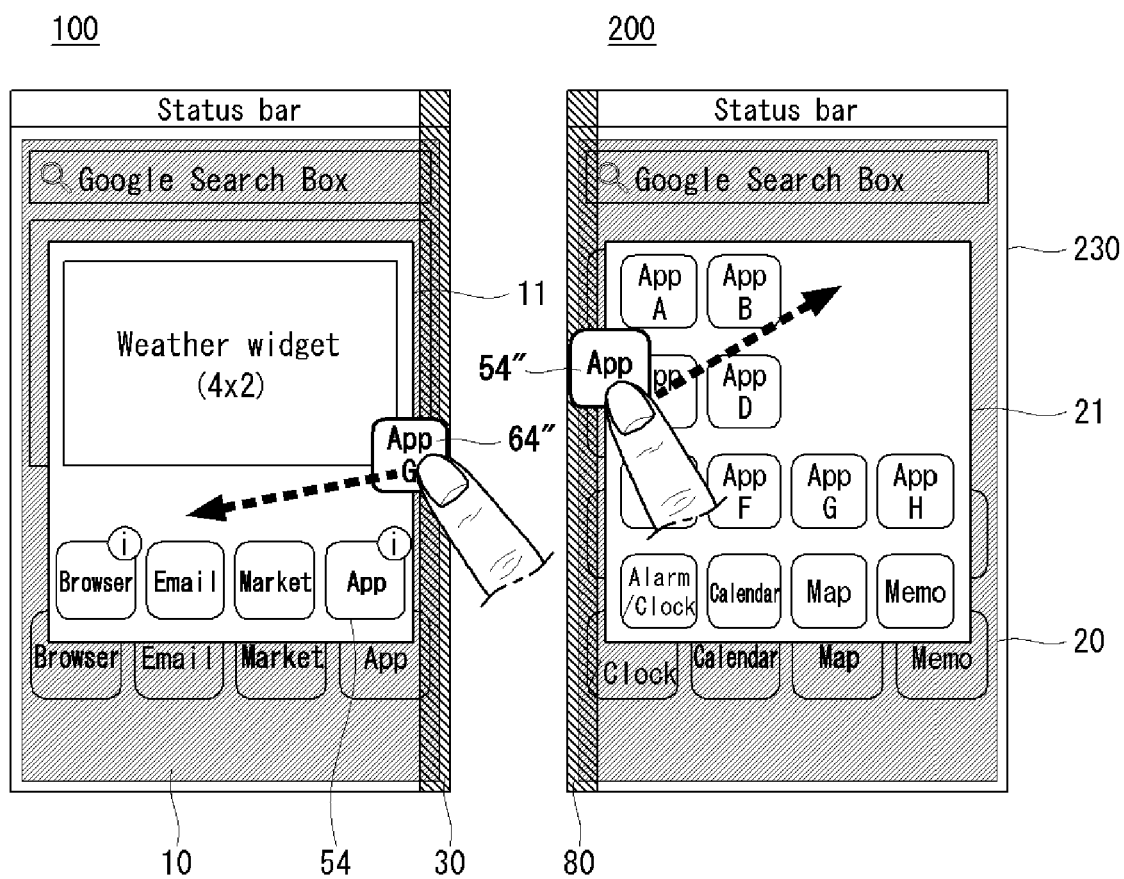

For example, referring to FIGS. 36 and 37, a first input of associating the first item 54 of the electronic device 100 with the first tray bar 30 may be received. Also, the external device 200 may receive a second input of associating the second item 64 with the second tray bar 80.

The first input and/or the second input may be simultaneously or sequentially input.

Referring to FIG. 36, in response to the first input and the second input, the electronic device 100 may share a second item 64" through the first tray bar 30, and the external device 200 may share a first item 54" through the second tray bar 80.

The first item 54" and the second item 64" may be disposed in particular positions, respectively, through a user input.

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

An electronic device may include a first touchscreen configured to display a first object, a second touchscreen configured to display a second object, and a controller configured to receive a first touch input applied to the first object and to link the first object to a function corresponding to the second object when receiving a second touch input applied to the second object while the first touch input is maintained.

A method may be provided of controlling an electronic device that includes displaying a first object on the first touchscreen, displaying a second object on the second touchscreen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a short-range communication module;
a touchscreen configured to display a first layer including at least one item; and
a controller configured to establish a communication link with at least one external device through the short-range communication module, display a second layer including at least one item sharable with the external device among at least one item included in the first layer, such that it overlaps with the first layer, and display a tray bar for sharing the at least one sharable item with the at least one external device in one lateral side of the touchscreen corresponding to a direction in which the external device is positioned.

2. The electronic device of claim 1, wherein when at least one external device exists in a particular position within a predetermined short-range communication range in the state in which the communication link is established, the controller displays the second layer on the first layer in an overlapping manner.

3. The electronic device of claim 1, wherein when a touch input of selecting a particular item among the at least one sharable item is received, the controller displays a guide indicating that the selected item interacts with the tray bar.

4. The electronic device of claim 1, wherein when a touch input of selecting a particular item among the at least one sharable item is received and the selected item interacts with the tray bar through a touch input previously determined for the selected item, the controller transmits a control signal for sharing the selected item with the at least one external device to the at least one external device through the communication link.

5. The electronic device of claim 4, wherein the control signal comprises a signal for controlling the selected item to be downloaded from an external server to the at least one external device.

6. The electronic device of claim 4, wherein when a touch input of moving the tray bar interacting with the selected item to the other lateral side of the touchscreen is received, the controller mirrors a screen of the external device and display the same in the second layer.

7. The electronic device of claim 6, wherein when a touch input of moving at least one item interacting with the tray bar to the second layer is received, the controller transmits a control signal for displaying at least one item on the screen of the external device, to the external device through the communication link.

8. The electronic device of claim 6, wherein when a touch input of moving the tray bar, which has moved to the other lateral side of the touchscreen, to the original position is received, the controller terminates the mirroring operation.

9. The electronic device of claim 4, wherein the interaction comprises a touch input of pushing the selected item outwardly from the touchscreen through the tray bar.

10. The electronic device of claim 4, wherein the predetermined touch input comprises a drag input for including the selected item in the tray bar.

11. The electronic device of claim 10, wherein the interaction is displaying the selected item such that the selected item is attached to the tray bar in response to the drag input.

12. The electronic device of claim 10, wherein the interaction comprises increasing an area of the tray bar in response to the drag input such that the tray bar comprises the selected item.

13. The electronic device of claim 1, further comprising:
a sensing unit disposed in at least a portion of a lateral body,
wherein when contact with the at least one external device is sensed through the sensing unit, the controller displays the second layer and the tray bar such that they overlap with the first layer.

14. The electronic device of claim 1, wherein the controller displays a sharing identifier with respect to at least one sharable item.

15. The electronic device of claim 1, wherein the short-range communication module comprises a near field communication (NFC) module, and
when the at least one external device approaches a position within a predetermined distance, an NFC communication link is established with the at least one external device through the NFC module.

16. The electronic device of claim 1, wherein when the second layer is displayed to overlap with the first layer, the controller deactivates the first layer.

17. The electronic device of claim 16, wherein when a predetermined touch input applied to the second layer is received, the controller removes the second layer and activates the first layer.

18. The electronic device of claim 16, wherein the second layer comprises a plurality of pages, and when a scroll input applied to the second layer is received, the controller changes and displays a page on the second layer.

19. The electronic device of claim 1, wherein the at least one item comprises at least one of an application, an image, and a video.

20. An electronic device comprising:
   a wireless communication unit;
   a touchscreen; and
   a controller configured to display at least one item on the touchscreen, display a bar having a predetermined size upon sliding it from one lateral side of the touchscreen when a predetermined touch input is received in a state in which the wireless communication unit is connected to an external device, receive a touch input of associating at least one of at least one item with the bar, mirror a screen of the external device and display the same on the touchscreen when an input of moving the bar to which the at least one item is associated, to the other lateral side of the touchscreen is received, and transmit a remote control signal for sharing the at least one item with the external device, to the external device when an input of moving at least one item associated with the bar to the mirrored screen.

21. The electronic device of claim 20, wherein the predetermined touch input comprises a touch input of selecting an item sharable with the external device among the at least one item displayed on the touchscreen.

22. The electronic device of claim 20, wherein a touch input of associating at least one of the at least one item with the bar comprises a touch input of including a particular item in the bar.

23. A control method of an electronic device, the method comprising:
   displaying a first layer including at least one item on a touchscreen;
   establishing a communication link with at least one external device through a short-range communication module;
   when the at least one external device exists in a particular position within predetermined short-range communication range, displaying a second layer including at least one item sharable with the external device among at least one item included in the first layer, such that the second layer overlaps with the first layer;
   selecting a particular item among the items included in the second layer; and
   displaying a tray bar for sharing the selected item with the at least one external device in one lateral side of the touchscreen corresponding to a direction in which the external device is positioned.

24. The control method of claim 23, further comprising:
   receiving a touch input to make the selected particular item interact with the tray bar; and
   transmitting a control signal for sharing the interacted item with the at least one external device to the at least one external device.

\* \* \* \* \*